US008275407B2

(12) United States Patent
Laroia et al.

(10) Patent No.: US 8,275,407 B2
(45) Date of Patent: Sep. 25, 2012

(54) METHODS AND APPARATUS FOR COMMUNICATING USING MULTIPLE TRANSMISSION POWER LEVELS

(75) Inventors: Rajiv Laroia, Far Hills, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 12/509,129

(22) Filed: Jul. 24, 2009

(65) Prior Publication Data
US 2011/0021235 A1  Jan. 27, 2011

(51) Int. Cl.
H04B 7/00 (2006.01)
H01Q 11/12 (2006.01)

(52) U.S. Cl. ............... 455/522; 455/126; 455/127.1; 370/318

(58) Field of Classification Search .............. 455/522, 455/126, 127.1; 370/318
See application file for complete search history.

(56) References Cited

U.S. PATENT DOCUMENTS

| | | | |
|---|---|---|---|
| 5,003,619 A | 3/1991 | Morris et al. | |
| 5,524,275 A | 6/1996 | Lindell | |
| 6,330,455 B1 * | 12/2001 | Ichihara | 455/522 |
| 7,146,139 B2 * | 12/2006 | Nevermann | 455/115.1 |
| 7,194,282 B2 | 3/2007 | Jarvisalo et al. | |
| 7,379,446 B2 * | 5/2008 | Laroia et al. | 370/345 |
| 7,471,927 B2 * | 12/2008 | Chen et al. | 455/39 |
| 7,995,527 B2 * | 8/2011 | Li et al. | 370/329 |
| 2004/0095902 A1 * | 5/2004 | Laroia et al. | 370/328 |
| 2004/0109432 A1 * | 6/2004 | Laroia et al. | 370/343 |
| 2007/0149237 A1 | 6/2007 | Russell et al. | |
| 2007/0280167 A1 | 12/2007 | Olexa et al. | |
| 2008/0069033 A1 * | 3/2008 | Li et al. | 370/328 |
| 2008/0069039 A1 * | 3/2008 | Li et al. | 370/329 |

FOREIGN PATENT DOCUMENTS

| | | |
|---|---|---|
| GB | 2445990 | 7/2008 |
| WO | WO2008034029 | 3/2008 |

OTHER PUBLICATIONS

International Search Report and Written Opinion—PCT/US2010/042818, International Search Authority—European Patent Office—Nov. 18, 2010.

* cited by examiner

Primary Examiner — Duc M Nguyen
(74) Attorney, Agent, or Firm — James O'Hare; Paul S. Holdaway

(57) ABSTRACT

Methods and apparatus for communicating information using different transmission power levels during different time periods are described. Various described methods and apparatus are well suited for use in a peer to peer wireless communication system. A device uses a high transmission power level for transmitting during a first predetermined period, so that information can be transmitted to at least some devices which are not reachable using lower transmission power levels. The high transmission power level used during the first predetermined period of time exceeds a maximum average permitted power level permitted for a second predetermined period of time. In some embodiments a device refrains from transmitting for a period of time after transmitting at the high transmission power level. In some embodiments the device transmits at a lower transmission power level during a third period of time following the first period of time.

19 Claims, 12 Drawing Sheets

METHODS AND APPARATUS FOR COMMUNICATING USING MULTIPLE TRANSMISSION POWER LEVELS

FIELD

Various embodiments relate to wireless communications methods and apparatus and, more particularly, to wireless communications methods and apparatus for transmitting information using multiple transmission power levels.

BACKGROUND

In a peer to peer communications system, peer communications devices may transmit information, e.g., peer discovery signals, traffic data, etc., as part of their operation. For transmitting the information, devices are however limited to a maximum average transmit power level based on government regulation intended to control interference with other devices and/or physical device constraints, e.g., heat dissipation issues.

In view of the above discussion it should be appreciated that it would be beneficial if methods and apparatus could be developed which would improve communication range and reach to farther away devices which may normally require signals to be transmitted at a much higher power levels without necessarily changing device hardware and without causing any physical damage to the transmitting device. Thus, it would be desirable if communication with devices could be achieved, at least for discovery purposes or low data rate communications, at ranges requiring use of transmit power levels far higher than those which can be achieved using the maximum average transmit power level as the maximum transmit power level.

SUMMARY

Methods and apparatus for wireless communications in a communications system, e.g., regional ad hoc peer to peer networks, are described. Among the described methods and apparatus are methods and apparatus for communicating information, e.g., to peer communications devices using different transmission power levels during different time periods. In some embodiments a high transmission power level is used for transmitting during a predetermined period of time, e.g., during a peer discovery transmission time period, so that peer discovery information can be transmitted to at least some devices which are not reachable using lower transmission power levels.

In various embodiments, the information transmitted at high power levels is transmitted at a power level which if maintained for more than a predetermined period will exceed a maximum average permitted power level that is permitted for the predetermined period of time. In some embodiments the maximum average permitted power level that is permitted for the predetermined period of time is a maximum average power level specified by a government regulation or communications standard. In some other embodiments the maximum average power level that is permitted for the predetermined period of time is a maximum average power level that if maintained for more than the predetermined period of time will result in physical damage to the transmitter of the communications device transmitting the signals. In order to ensure compliance with the standard or regulation and/or to avoid physical damage to the transmitter of the communications device, following transmission at the high power level, the transmitter is controlled to refrain from transmitting or to transmit at a lower power level for a period of time thereby maintaining compliance with the standard or regulation and/or avoiding physical damage to the communications device. The high power level transmission may, and in some embodiments does, exceed the maximum average permitted power level by 2, 3 or more times, e.g., in some cases 10 or more times.

High power level and other transmissions, e.g., data traffic transmissions, may occur in accordance with a schedule of periodic transmission time periods, e.g., discovery transmission time periods and traffic data transmission time periods. In some embodiments, the discovery transmission time periods are of shorter duration than the traffic transmission time periods. High power transmissions are used in some embodiments for one or more transmissions during the discovery transmission time periods while lower power transmissions are used during traffic transmission time periods. In some embodiments high power transmissions are used for communicating data, e.g., traffic data to a distant device while lower power transmissions are used to communicate data to a closer, e.g., a nearby device. In some embodiments the transmissions to the distant device are timed so that they occur at a rate which will not result in the maximum average transmit power being exceeded, even though the signals are transmitted at high power levels. In some such embodiments, the device transmitting data using the high power level to a distant device intentionally selects one or more other devices which it is possible to communicate with using low transmission power levels after transmitting to the distant device. This is achieved in some embodiments by removing the distant device from a set of peer devices which are considered for communicating with for a period of time after a transmission to the distant device. In this manner, communication with the distant device will be interspaced with communication with other devices which can be reached using lower power levels or with periods where transmission to other devices is avoided even though there may be data waiting to be transmitted to the distant device.

An exemplary method of operating a communications device, in accordance with one exemplary embodiment comprises: transmitting during a first predetermined period of time using a first average transmission power level, said first average transmission power level exceeding a maximum average permitted power level that is permitted for a second predetermined period of time, and transmitting during a third period of time using a second average transmission power level which is lower than said first average transmission power level.

One exemplary communications device comprises: at least one processor configured to: transmit during a first predetermined period of time using a first average transmission power level, said first average transmission power level exceeding a maximum average permitted power level that is permitted for a second predetermined period of time; and transmit during a third period of time using a second average transmission power level which is lower than said first average transmission power level. The communications device may, and in some embodiments does, include a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
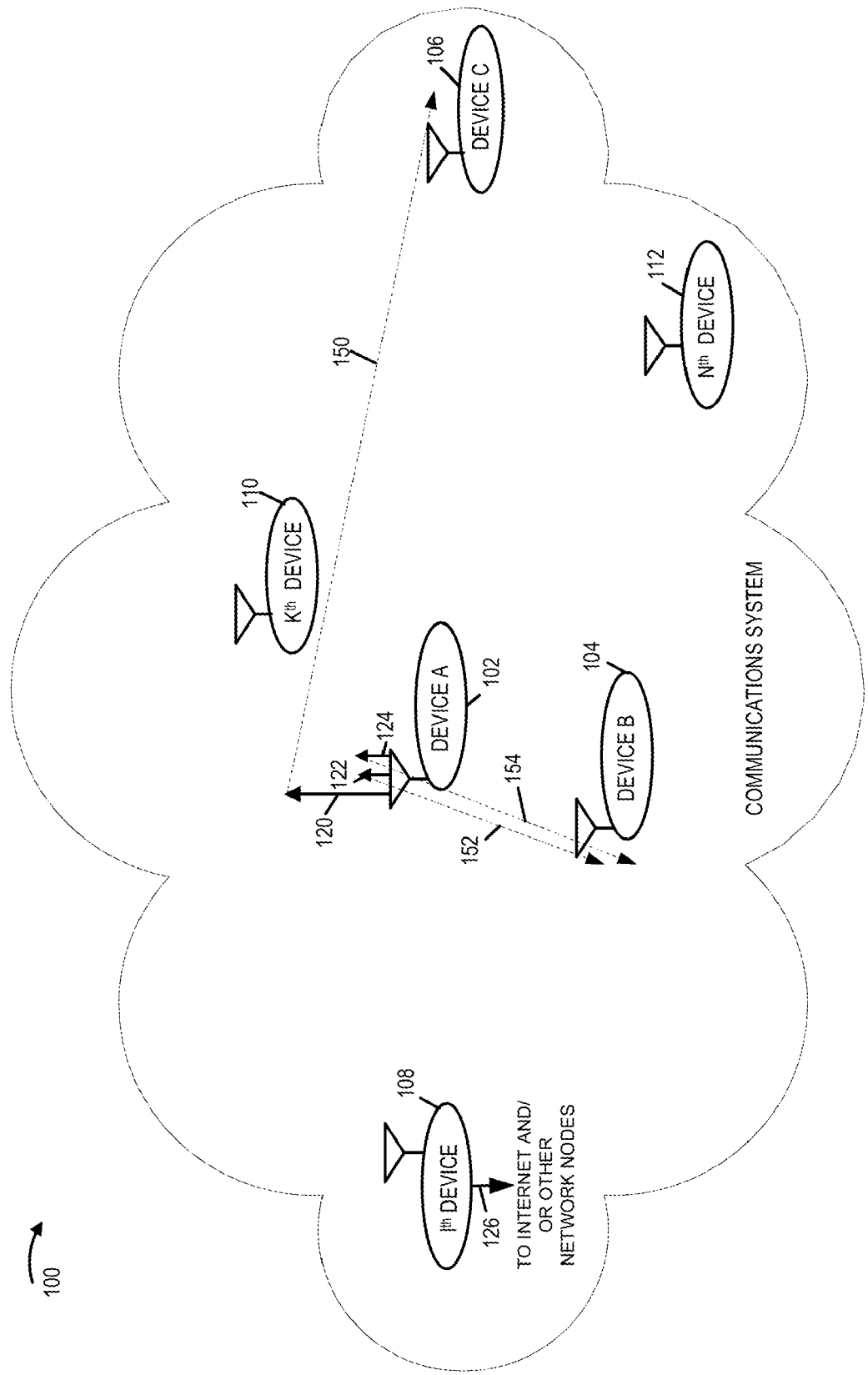
FIG. 1 illustrates an exemplary peer to peer wireless communications system, in accordance with an exemplary embodiment.

FIG. 1 illustrates an exemplary communications system 100 e.g., an exemplary peer to peer communications network, implemented in accordance with one exemplary embodiment. Exemplary communications system 100 includes a plurality of wireless communications devices including communications device A 102, communications device B 104, communications device C 106, $I^{th}$ communications device 108, $K^{th}$ communications device 110, . . . , and $N^{th}$ communications device 112. The communications devices (102, 104, 106, 108, 110, . . . , 112) support peer to peer communications. The wireless communications devices (102, 104, 106, 108, 110, . . . , 112) support various signaling between peers, e.g., peer discovery signals, paging/connection establishment signals, traffic data transmissions, etc. Some of the peer to peer communications devices, e.g., device 102, 104, 106 and 110 are mobile communications devices, e.g., mobile terminals such as handheld mobile communications devices. Some other devices, e.g., $I^{th}$ device 108, may be fixed location devices such as, e.g., an access router device including a wireless interface supporting a peer to peer signaling protocol and a wired interface providing coupling to a backhaul network. Exemplary $I^{th}$ communications device 108 provides access to the Internet and/or other network nodes via a wired or fiber network connection 126.

One or more communications devices in system 100 may broadcast or transmit signals, e.g., peer discovery signals, paging/connection establishment signals and/or traffic data signals to one or more of other communications devices in the communications system 100. For the purpose of illustration and as an example, in FIG. 1, communications device A 102 is shown transmitting exemplary signals 120, 122 and 124, which may be detected by others devices in its vicinity. Other communications devices in the network 100, may also be transmitting signals. As can be seen in the FIG. 1 system example, some of the communications devices, e.g., communications device B 104, $K^{th}$ device 110, are closer in terms of the physical distance from communications device A 102, while others such as device C 106, $I^{th}$ device 108 and $N^{th}$ device 112 are farther away from communications device A 102.

In accordance with one aspect, a communications device A 102, transmits at least some of the signals 120, 122 and 124 communicating information using different average transmission power levels during different periods of time. For example, device A 102 transmits signal 120 during a first period of time at a high transmission power level to increase the communication range and so that it can reach farther away devices such as device C 106. Consider that the range of signal 120 is represented by the length of dashed line arrow 150. In this example, the range of signal 120 is sufficient to reach device B 104, device C 106, $I^{th}$ device 108, $K^{th}$ device 110, and $N^{th}$ device 112. Device A 102 transmits signals 122 and 124 during another time period at much lower transmission power levels. The range of signal 122 is represented by the length of dashed line arrow 152, and the range of signal 124 is represented by the length of dashed line arrow 154. The signals 122, 124 transmitted at lower power levels can reach nearby device B 104 and $K^{th}$ device 110; however signals 122, 124 can not reach device C 106, $I^{th}$ device 108 and $N^{th}$ device 112. In some embodiments, communications device A 102 is controlled to refrain from transmitting signals for a period following the first period of time during which signal 120 was transmitted at the high power level. Then, after the controlled transmission null period, device A 102 may, and sometimes does transmit signal 122 and/or signal 124.

Figure 2:
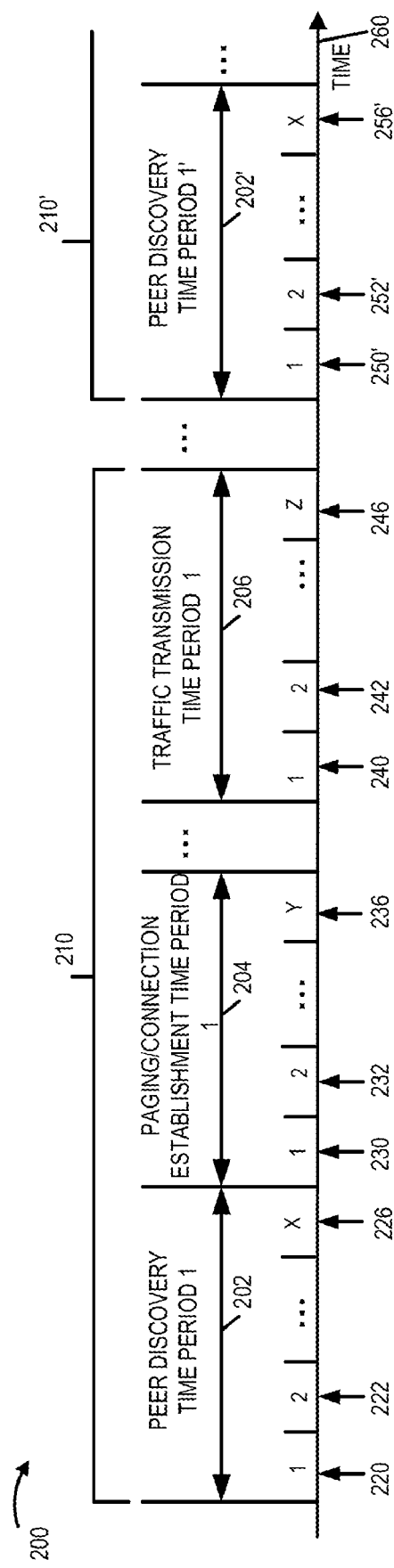
FIG. 2 illustrates exemplary time periods which recur in an exemplary peer to peer transmission time period schedule, in accordance with various embodiments.

FIG. 2 illustrates exemplary time periods which recur in an exemplary peer to peer transmission time period schedule 200, in accordance with various embodiments. The horizontal axis 260 in FIG. 2 represents time. The illustrated transmission time period schedule 200 includes a recurring time period, as illustrated by first iteration of the recurring time period 210 followed by second iteration of the recurring time period 210'. Time period 210 includes a peer discovery time period 1 202, a paging/connection establishment time period 1 204, . . . , a traffic transmission time period 1 206, etc. Similarly, time period 210' includes peer discovery time period 1' 202', paging/connection establish time period 1', traffic transmission time period 1', etc. It should be appreciated that various time periods (202, 204, 206) in schedule 200 need not be contiguous, e.g., one or more other time periods may be interspersed between the illustrated time periods (202, 204, 206). The sequence of time periods repeats as part of a recurring timing schedule.

As shown in the FIG. 2 example, each of the exemplary timing periods (202, 204, . . . , 206) include a plurality of time slots, each of which represents a period of time. A time slot may, and in some embodiments does, include one or more symbol transmission time periods. The exemplary peer discovery time period 1 202 includes time slot 1 220, time slot 2 222, . . . , and time slot X 226. Exemplary paging/connection establishment time period 204 includes time slot 1 230, time slot 2 232, . . . , and time slot Y 236. Exemplary traffic transmission time period 1 206 includes time slot 1 240, time slot 2 242, . . . , and time slot Z 246. Peer discovery time period 1' 202' includes time slot 1 250', time slot 2 252', . . . , and time slot X 256'.

In accordance with one aspect of some embodiments, one or more communications devices in a communications system, e.g., device A 102 in system 100, use peer discovery time periods such as time period 202 and/or time period 202' to broadcast peer discovery signals to one or more other devices so that other devices in the system can discover the presence of device A 102 and/or discovery information being transmitted from device A 102. In some embodiments the peer discovery signals indicate the presence of the transmitting device. It should be appreciated that during one or more time slots in the peer discovery time period, device A 102 may not transmit a peer discovery signal. During slots in the peer discovery time period where device A 102 is not transmitting, device A 102 may, and sometimes does, monitor for or listens to other peer discovery signals which may be transmitted by other communications devices in the system 100.

Directed communications, e.g., such as signaling for establishing a connection, and traffic transmission from one device to another, occur in other time periods such as time periods 204 and 206. If other devices which receive the peer discovery signals from device A 102 are interested in communicating with device A 102, then they can send a paging signal to device A 102 to establish a connection during the paging/connection establishment time period such as during time period 204. Once the connection is established, traffic data, between device A 102 and one or more of the other devices with which connection has been established, can be transported during the traffic transmission time period such as time period 206. It should be appreciated that a device may transmit during one or more of the time slots within each of the time periods, e.g., during peer discovery time period, paging/connection establishment time period, traffic transmission time period.

Figure 3:
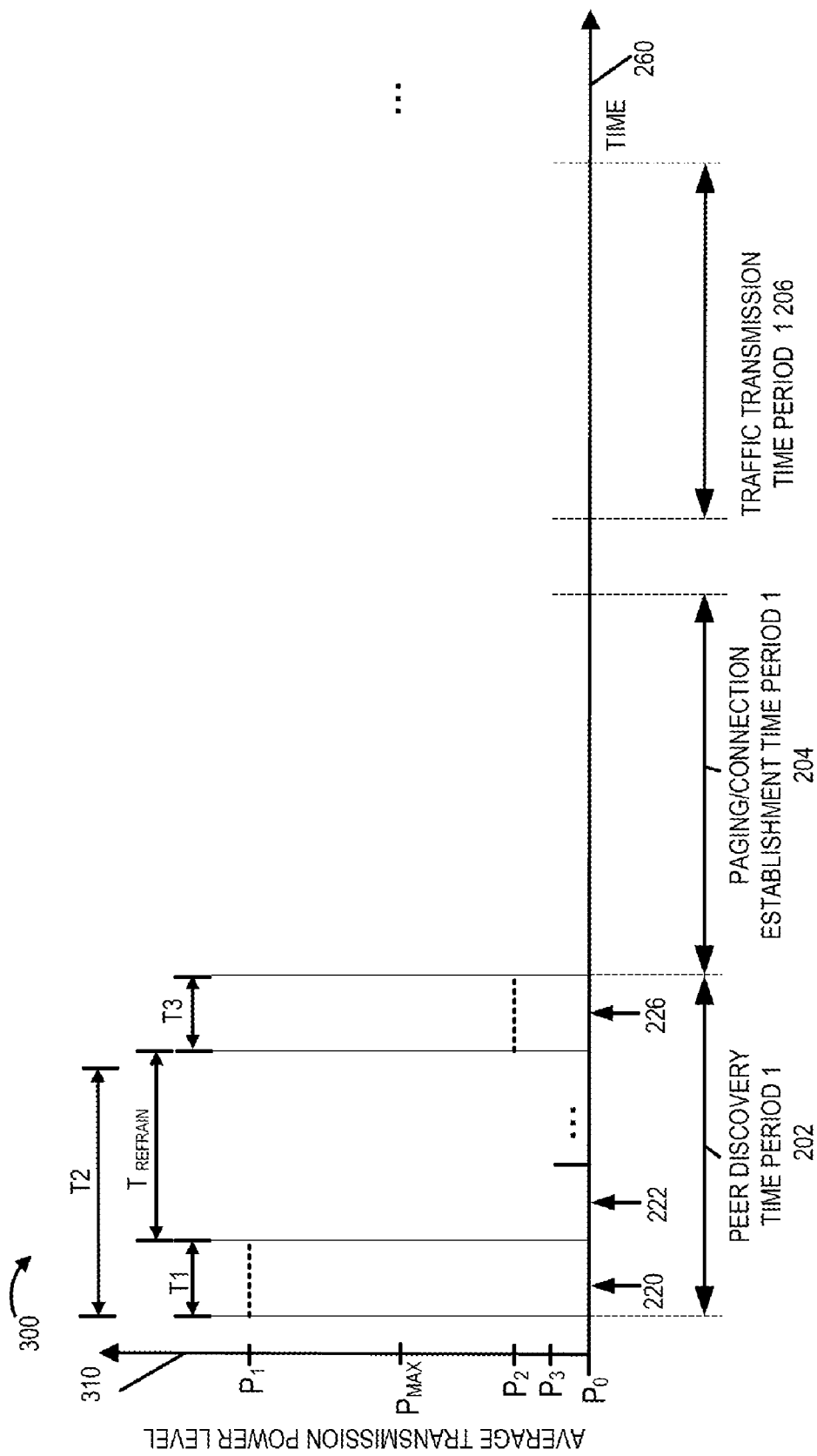
FIG. 3 is a drawing illustrating an example in which different transmission power levels are used by a peer to peer communications device during different time slots of a peer discovery interval, in accordance with an exemplary embodiment.

FIG. 3 is an exemplary diagram 300 illustrating exemplary transmission power levels associated with various signals transmitted during different periods of time, in accordance with one exemplary embodiment. In FIG. 3 the vertical axis 310 represents average transmission power level and the horizontal axis 260 represents time. FIG. 3 shows various exemplary average transmission power levels such as a first average transmission power level $P_1$, a second average transmission power level $P_2$, a third average transmission power level $P_3$, and a zero or null average transmission power level $P_0$ that may be used by a communications device for transmitting signals during different time slots of the exemplary time periods 202, 204, 206, etc. It should be appreciated that when using an average power transmission power level, the transmission power may temporarily exceed or drop below the average but will average to the indicated transmission power level for a particular time period, e.g., a given time slot or group of time slots.

In addition to $P_0$, $P_1$, $P_2$, $P_3$, a maximum permitted average transmission power level $P_{MAX}$ that is permitted for a predetermined period of time, is also shown on vertical axis 310. The exemplary time periods 202, 204, 206 each of which includes one or more time slots discussed in FIG. 2, have been used for illustration purposes in the examples presented in FIG. 3 and have been identified using the same reference numbers. Each time slot or a group of time slots in the exemplary time periods 202, 204 and 206 may sometimes represent a different period of time.

In accordance with one aspect, a communications device, e.g., device A 102, transmits during a first predetermined period of time T1 using the first average transmission power level $P_1$, which exceeds the maximum average permitted power level $P_{MAX}$ that is permitted for a second predetermined period of time T2, and transmits during a third period of time T3 using a second average transmission power level $P_2$ which is lower than the first average power level $P_1$. In the FIG. 3 example, use of the first average transmission power level $P_1$ is shown during the first predetermined period of time T1, e.g., slot 220. In the exemplary embodiment of FIG. 3, first and third periods of time T1 and T3 are part of the peer discovery time period 1 202. It may be observed that the first predetermined period of time T1 is shorter than the second predetermined period of time T2.

A communications device such as device A 102 may transmit a signal, e.g., a peer discovery signal, during T1 using the first average transmission power level $P_1$. As shown in FIG. 3, $P_1$ is much higher than the maximum permitted average transmission power level $P_{MAX}$. It should be appreciated that by using a much higher transmission power level $P_1$ during T1, device A 102 can broadcast discovery signals that can reach farther away devices which normally may not be reachable using lower transmission power levels. In some embodiments, the first average transmission power level $P_1$ is at least twice the maximum average permitted power level $P_{MAX}$. In some embodiments, in terms of dBs, $P_1/P_{MAX}$ is greater than or equal to 3 dBs. In some such embodiments, $P_1/P_{MAX}$ is greater than or equal to 10 dBs.

Device A 102 refrains from transmitting signals following the first predetermined period of time T1, for a period of time $T_{REFRAIN}$. In this example $T_{REFRAIN}$ is longer than the difference between the second predetermined period of time T2 and the first predetermined period of time T1. In various embodiments, $P_1$ is selected such that an average transmit power over time T2 is below $P_{MAX}$.

Device A 102 transmits, e.g., a peer discovery signal, during third period of time T3 at average power level $P_2$, where the third period of time T3 corresponds to peer discovery slot 226. It may be observed that the second average transmission power level $P_2$ does not exceed the maximum average permitted power level.

In some embodiments, the same peer discovery information is communicated during first period of time T1 and third period of time T3. In some other embodiments, different peer discovery information is communicated in first time period T1 and third time period T3. In one such embodiment, different types of peer discovery information are communicated in time periods T1 and T3. For example, a device identifier and/or device location information is communicated in time period T1 intended to reach peer to peer devices within a wide range, and an advertisement or request for a service is transmitted in time period T3 intended to reach peer to peer devices within a local region.

In some embodiments the first predetermined period of time T1 is a fixed period of time which recurs within a transmission time period schedule, e.g., schedule 200, according to a predetermined fixed pattern. In some embodiments, the maximum average permitted power level $P_{MAX}$, referred to in FIG. 3, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$, is a permitted power level permitted by government regulation or a communications protocol supported by the transmitter and being said fifth period of time when said maximum average permitted power level is a transmission power level which can be maintained without physical damage to said transmitter.

Figure 4:
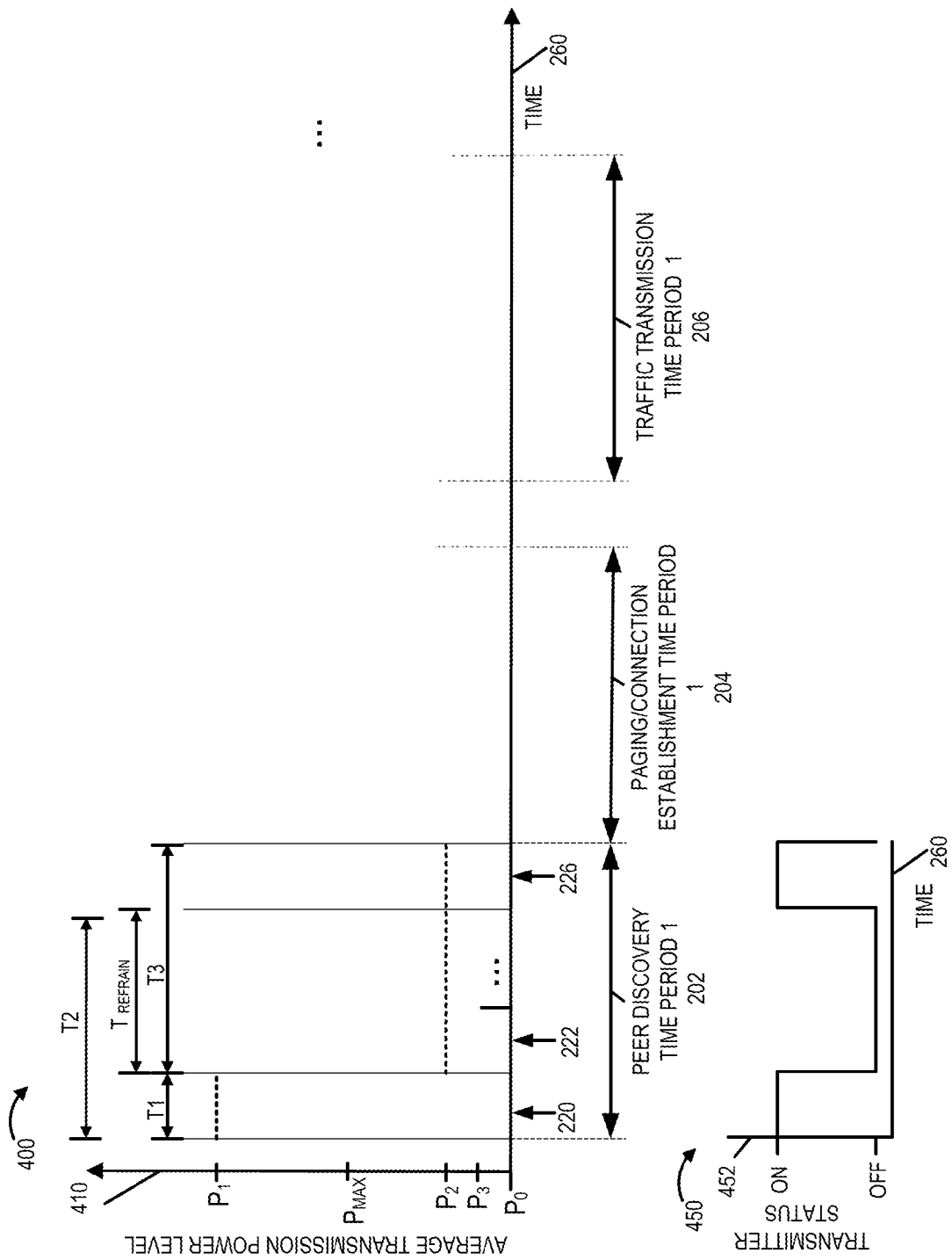
FIG. 4 includes an exemplary diagram illustrating exemplary transmission power levels associated with various signals transmitted during different predetermined time periods and a corresponding transmitter status plot for a peer discovery time period in accordance with one exemplary embodiment.

FIG. 4 includes an exemplary diagram 400 illustrating exemplary transmission power levels associated with various signals transmitted during different periods of time and a corresponding transmitter status plot 450 for a peer discovery time period, in accordance with one exemplary embodiment. In diagram 400 of FIG. 4 the vertical axis 410 represents average transmission power level and the horizontal axis 260 represents time. FIG. 4 shows various exemplary average transmission power levels such as a first average transmission power level $P_1$, a second average transmission power level $P_2$, a third average transmission power level $P_3$, and a zero or null average transmission power level $P_0$ that may be used by a communications device for transmitting signals during different time slots of the exemplary time periods 202, 204, 206, etc. It should be appreciated that when using an average power transmission power level the transmission power may temporarily exceed or drop below the average but will average to the indicated transmission power level for a particular time period, e.g., a given time slot or group of time slots.

In addition to $P_0$, $P_1$, $P_2$, $P_3$, a maximum permitted average transmission power level $P_{MAX}$ that is permitted for a predetermined period of time, is also shown on vertical axis 410. The exemplary time periods 202, 204, 206 each of which includes one or more time slots discussed in FIG. 2, have been used for illustration purposes in the examples presented in FIG. 4 and have been identified using the same reference numbers. Each time slot or a group of time slots in the exemplary time periods 202, 204 and 206 may sometimes represent a different period of time.

In accordance with one aspect, a communications device, e.g., device A 102, transmits during a first predetermined period of time T1 using the first average transmission power level $P_1$ which exceeds the maximum average permitted power level $P_{MAX}$ that is permitted for a second predetermined period of time T2, and transmits during a third period of time T3 using a second average transmission power level $P_2$ which is lower than the first average power level. In the FIG. 4 example, use of the first average transmission power level $P_1$ is shown during the first predetermined period of time T1, e.g., slot 220. In the exemplary embodiment of FIG. 4, first and third periods of time T1 and T3 are part of the peer discovery time period 1 202. It may be observed that the first predetermined period of time T1 is shorter than the second predetermined period of time T2. In this example, the third predetermined period of time T3 is longer than the first predetermined period of time T1. In some embodiments, the third period of time T3 equals or exceeds the second predetermined period of time. In the example of FIG. 4, the third predetermined period of time T3 exceeds the second predetermined period of time T2.

A communications device such as device A 102 may transmit, e.g., a peer discovery signal, during T1 using the first average transmission power level $P_1$. As shown in FIG. 3, $P_1$ is much higher than the maximum permitted average transmission power level $P_{MAX}$. It should be appreciated that by using a much higher transmission power level $P_1$ during T1, device A 102 can broadcast discovery signals that can reach farther away devices which normally may not be reachable using lower transmission power levels. In some embodiments, the first average transmission power level $P_1$ is at least twice the maximum average permitted power level $P_{MAX}$. In some embodiments, in terms of dBs, $P_1/P_{MAX}$ is greater than or equal to 3 dBs. In some such embodiments, $P_1/P_{MAX}$ is greater than or equal to 10 dBs.

Device A 102 refrains from transmitting signals following the first predetermined period of time T1, for a period of time $T_{REFRAIN}$. In this example $T_{REFRAIN}$ is longer than the difference between the second predetermined period of time T2 and the first predetermined period of time T1. In various embodiments, $P_1$ is selected such that an average transmit power over time T2 is below $P_{MAX}$.

Device A 102 transmits during third period of time T3 at second average power level $P_2$, where the third period of time T3 corresponds to a time period including a plurality of peer discovery slots (peer discovery slot 222, . . . , peer discovery slot 226). In some embodiments, the third period of time T3 is at least ten times longer than the first predetermined period of time T1.

Transmitter status plot 450 includes a vertical axis 452 identifying transmitter status and a horizontal axis 260 representing time. The transmitter status plot 450 indicates that the transmitter transmits at non-null power levels during peer discovery slots 220 and 226, but does not transmit non-null signals during the intermediate peer discovery slots including slots 222. The intermediate slots correspond to the time interval of $T_{REFRAIN}$. Third period of time T3 includes the time period of $T_{REFRAIN}$ and time slot 226, and second average power level $P_2$ corresponds to time period T3; therefore, the average transmit power during time slot 226 is greater than $P_2$. A peer discovery signal is conveyed by the transmission that occurs during the slot 226 portion of third period of time T3. It may be observed that the second average transmission power level $P_2$ does not exceed the maximum average permitted power level.

In some embodiments, the same peer discovery information is communicated during first period of time T1 and slot 226 of third period of time T3. In some other embodiments, different peer discovery information is communicated in first time period T1 and slot 226 of third time period T3. In one such embodiment, different types of peer discovery information are communicated in time periods T1 and T3. For example, a device identifier and/or device location information is communicated in time period T1 intended to reach peer to peer devices within a wide range, and an advertisement or request for a service is transmitted in time period T3 intended to reach peer to peer devices within a local region.

In some embodiments the first predetermined period of time T1 is a fixed period of time which recurs within a transmission time period schedule, e.g., schedule 200, according to a predetermined fixed pattern. In some embodiments, the maximum average permitted power level $P_{MAX}$, referred to in FIG. 4, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$, is a permitted power level permitted by government regulation or a communications protocol supported by the transmitter and being said fifth period of time when said maximum average permitted power level is a transmission power level which can be maintained without physical damage to said transmitter.

Figure 5:
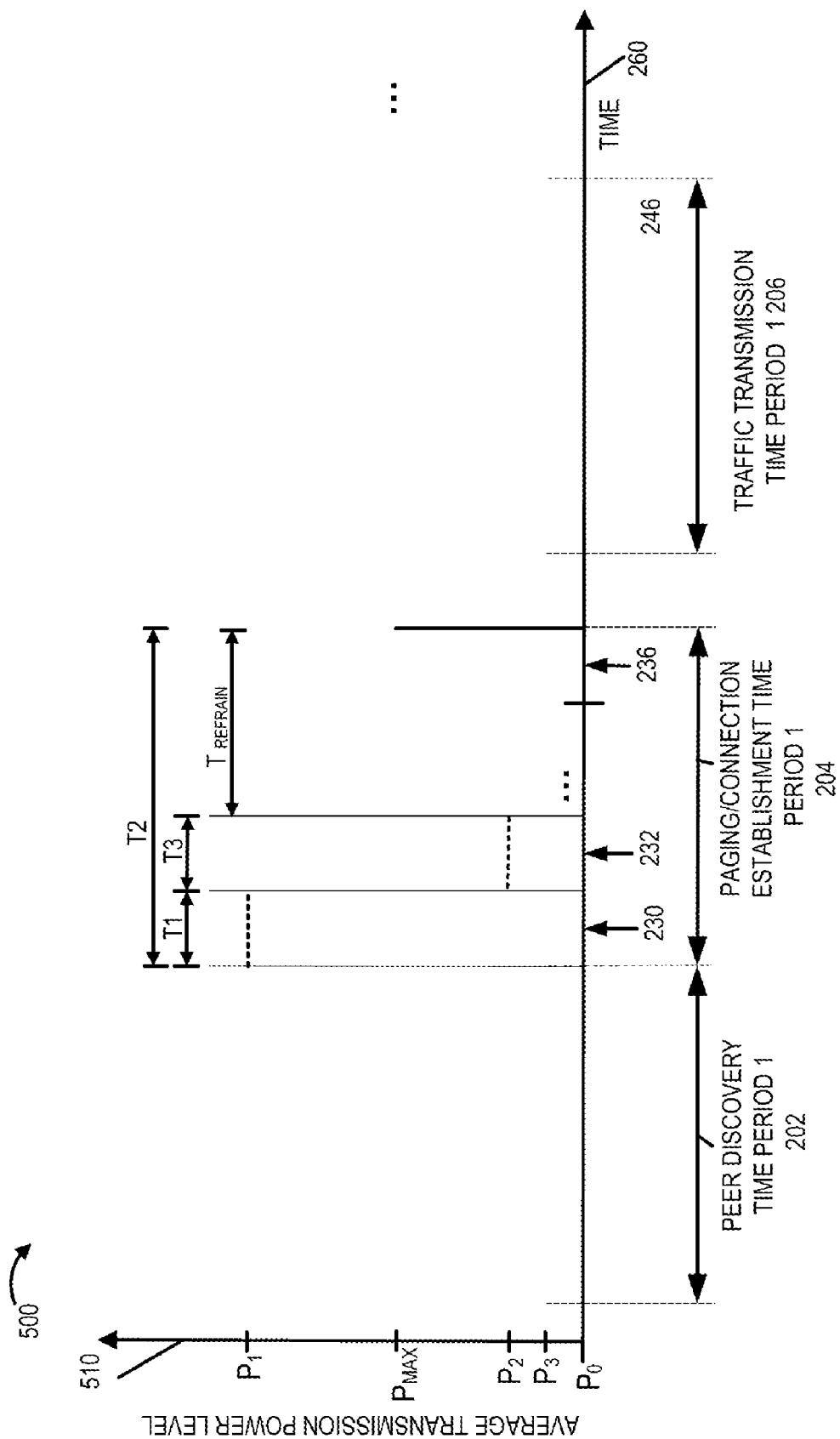
FIG. 5 is a diagram illustrating exemplary transmission power levels associated with various signals transmitted during different periods of time of a paging/connection establishment time period, in accordance with one exemplary embodiment.

FIG. 5 is an exemplary diagram 500 illustrating exemplary transmission power levels associated with various signals transmitted during different periods of time, in accordance with one exemplary embodiment. In FIG. 5 the vertical axis 510 represents average transmission power levels and the horizontal axis 260 represents time. FIG. 5 illustrates exemplary transmission power levels $P_0$, $P_1$, $P_2$, $P_{MAX}$ etc., associated with various signals transmitted during different periods of time. In accordance with one aspect, when a communications device, e.g., device A 102, discovers another device of interest and wishes to establish a connection, it transmits a paging/connection establishment signal directed to the device of interest, during the paging/connection establishment time period 1 204. FIG. 5 illustrates an example where a device transmits a paging signal to another device of interest during a first predetermined period of time T1, which corresponds to time slot 230, using the first average transmission power level $P_1$ which exceeds the maximum average permitted power level $P_{MAX}$ that is permitted for a second predetermined period of time T2. The device transmits a second paging signal to a second device of interest during a third period of time T3, which corresponds to time slot 232, using the second average transmission power level $P_2$ which is lower than the first average power level $P_1$. As shown in the exemplary embodiment of FIG. 5, first and third transmission periods of time T1 and T3 are part of the paging/connection establishment time period 1 204.

In various embodiments, the communications device identifies devices to be paged and matches an identified device to be paged with one of the high power paging predetermined time slot and the low power paging time slot. In some embodiments, the matching of device to be paged to a transmission power level is performed as a function of received power levels of peer discovery signals.

In this example, there is also a time period $T_{REFRAIN}$ during the paging/connection establishment time period 204 during which the device is controlled refrain from transmitting. In this example, $T_{REFRAIN}$ is longer than the first predetermined period of time $T_1$. It may also be observed that the second average transmission power level $P_2$ does not exceed the maximum average permitted power level $P_{MAX}$.

In some embodiments the first predetermined period of time T1 is a fixed period of time which recurs within a transmission time period schedule, e.g., schedule 200, according to a predetermined fixed pattern. In some embodiments, the maximum average permitted power level $P_{MAX}$, referred to in FIG. 5, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$ is a permitted power level permitted by government regulation or a communications protocol supported by the transmitter and being said fifth period of time when said maximum average permitted power level is a transmission power level which can be maintained without physical damage to said transmitter.

Figure 6:
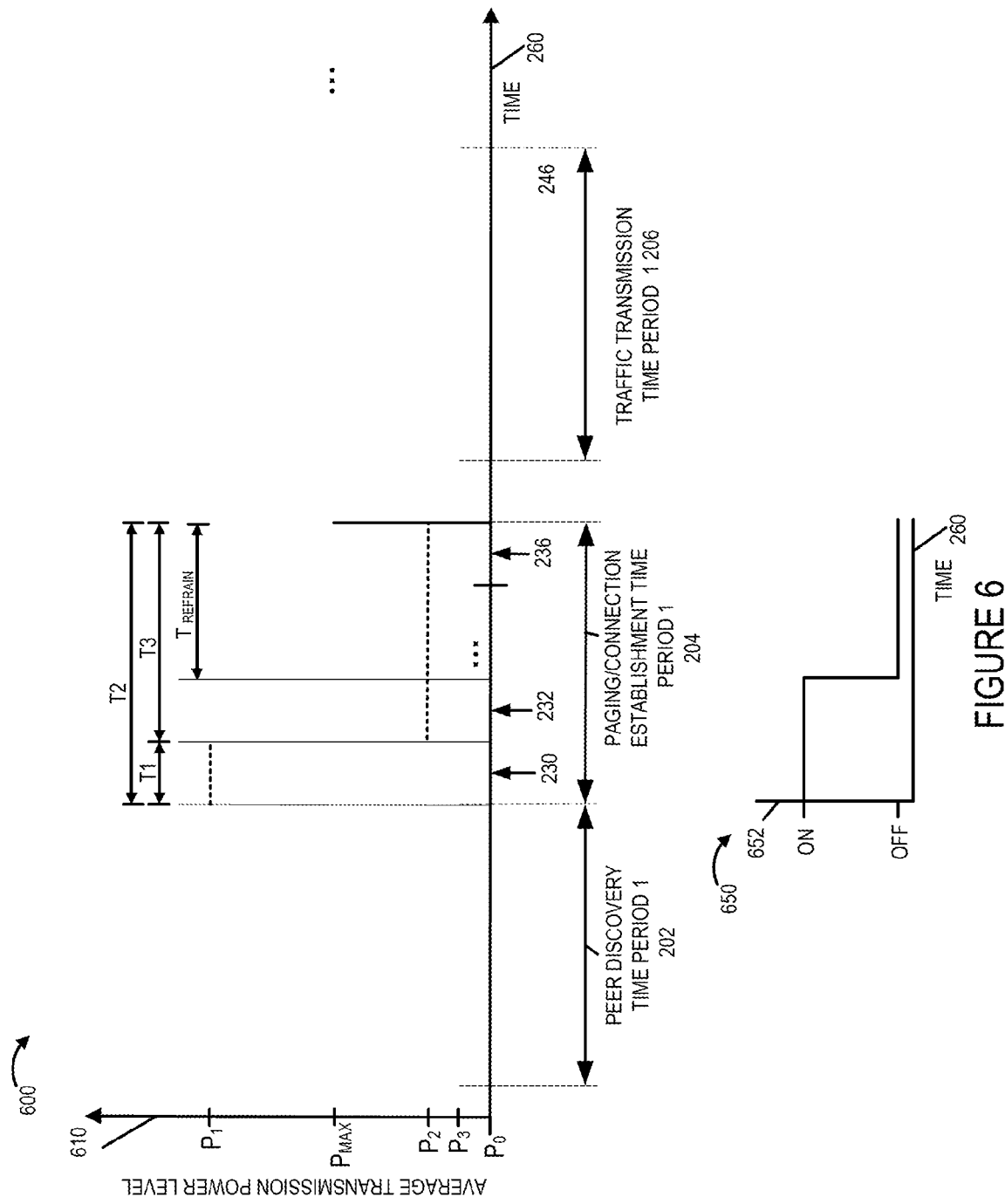
FIG. 6 includes an exemplary diagram illustrating exemplary transmission power levels associated with various signals transmitted during different periods of time and a corresponding transmitter status plot for a paging/connection establishment time period, in accordance with one exemplary embodiment.

FIG. 6 includes an exemplary diagram 600 illustrating exemplary transmission power levels associated with various signals transmitted during different periods of time and a corresponding transmitter status plot 650 for a paging/connection establishment time period, in accordance with one exemplary embodiment. In diagram 600 of FIG. 6 the vertical axis 610 represents average transmission power level and the horizontal axis 260 represents time. FIG. 6 shows various exemplary average transmission power levels such as a first average transmission power level $P_1$, a second average transmission power level $P_2$, a third average transmission power level $P_3$, and a zero or null average transmission power level $P_0$ that may be used by a communications device for transmitting signals during different time slots of the exemplary time periods 202, 204, 206, etc. It should be appreciated that when using an average power transmission power level the transmission power may temporarily exceed or drop below the average but will average to the indicated transmission power level for a particular time period, e.g., a given time slot or group of time slots.

In addition to $P_0$, $P_1$, $P_2$, $P_3$, a maximum permitted average transmission power level $P_{MAX}$ that is permitted for a predetermined period of time, is also shown on vertical axis 610. The exemplary time periods 202, 204, and 206 each of which includes one or more time slots discussed in FIG. 2, have been used for illustration purposes in the examples presented in FIG. 4 and have been identified using the same reference numbers. Each time slot or a group of time slots in the exemplary time periods 202, 204 and 206 may sometimes represent a different period of time.

In accordance with one aspect, a communications device, e.g., device A 102, transmits during a first predetermined period of time T1 using the first average transmission power level $P_1$ which exceeds the maximum average permitted power level $P_{MAX}$ that is permitted for a second predetermined period of time T2, and transmits during a third period of time T3 using a second average transmission power level $P_2$ which is lower than the first average power level. In the FIG. 6 example, use of the first average transmission power level $P_1$ is shown during the first predetermined period of time T1, e.g., slot 230. In the exemplary embodiment of FIG. 6, first and third periods of time T1 and T3 are part of the paging/connection establishment time period 1 204. It may be observed that the first predetermined period of time T1 is shorter than the second predetermined period of time T2. In this example, the third predetermined period of time T3 is longer than the first predetermined period of time T1. In the example of FIG. 6, the third predetermined period of time plus the first predetermined period of time equals the second predetermined period of time. In some other embodiments, the third period of time T3 equals or exceeds the second predetermined period of time.

A communications device such as device A 102 may transmit, e.g., a first paging signal, during T1 using the first average transmission power level $P_1$. As shown in FIG. 6, $P_1$ is much higher than the maximum permitted average transmission power level $P_{MAX}$. It should be appreciated that by using a much higher transmission power level $P_1$ during T1, device A 102 can transmit a paging signal that can reach farther away devices which normally may not be reachable using lower transmission power levels. In some embodiments, the first average transmission power level $P_1$ is at least twice the maximum average permitted power level $P_{MAX}$. In some embodiments, in terms of dBs, $P_1/P_{MAX}$ is greater than or equal to 3 dBs. In some such embodiments, $P_11/P_{MAX}$ is greater than or equal to 10 dBs.

Device A 102 transmits during third period of time T3 at second average power level $P_2$, where the third period of time T3 corresponds to a time period including a plurality of peer discovery slots (paging/connection establishment slot 232, . . . , paging/connection establishment slot 236). In some embodiments, the third period of time T3 is at least ten times longer than the first predetermined period of time T1. During slot 232 of paging/connection establishment time period 204, device A 102 transmits a second paging signal. Device A 102, in some embodiments, selectively pairs devices to be paged with different slots associated with different power levels.

Device A 102 refrains from transmitting signals following the first predetermined period of time T1 and first slot of the third predetermined period of time T3, for a period of time $T_{REFRAIN}$. In this example $T_{REFRAIN}$ is longer than the difference between the second predetermined period of time T2 and the first predetermined period of time T1. In various embodiments, $P_1$ is selected such that an average transmit power over time T2 is below $P_{MAX}$.

Transmitter status plot 650 includes a vertical axis 652 identifying transmitter status and a horizontal axis 260 representing time. The transmitter status plot 650 indicates that the transmitter transmits at non-null power levels during paging/connection establishment slots 230 and 232, but does not transmit non-null signals during the subsequent slots of time period 204. These subsequent slots correspond to the time interval of $T_{REFRAIN}$. Third period of time T3 includes slot 232 and the time period of $T_{REFRAIN}$, and second average power level $P_2$ corresponds to time period T3; therefore, the average transmit power during time slot 232 is greater than P2. A paging signal is conveyed by the transmission that occurs during the slot 232 portion of third period of time T3. It may be observed that the second average transmission power level $P_2$ does not exceed the maximum average permitted power level.

In some embodiments, the same paging information is communicated during first period of time T1 and slot 232 of third period of time T3. In some other embodiments, different paging information is communicated in first time period T1 and slot 232 of third time period T3, e.g., a page directed to a first detected wireless terminal of interest situated far away is transmitted in first period of time T1, and a page directed to a second detected wireless terminal of interest situated relatively close is transmitted in slot 232 of third time period T3.

In some embodiments the first predetermined period of time T1 is a fixed period of time which recurs within a transmission time period schedule, e.g., schedule 200, according to a predetermined fixed pattern. In some embodiments, the maximum average permitted power level $P_{MAX}$, referred to in FIG. 6, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$ is a permitted power level permitted by government regulation or a communications protocol supported by the transmitter and being said fifth period of time when said maximum average permitted power level is a transmission power level which can be maintained without physical damage to said transmitter.

Figure 7:
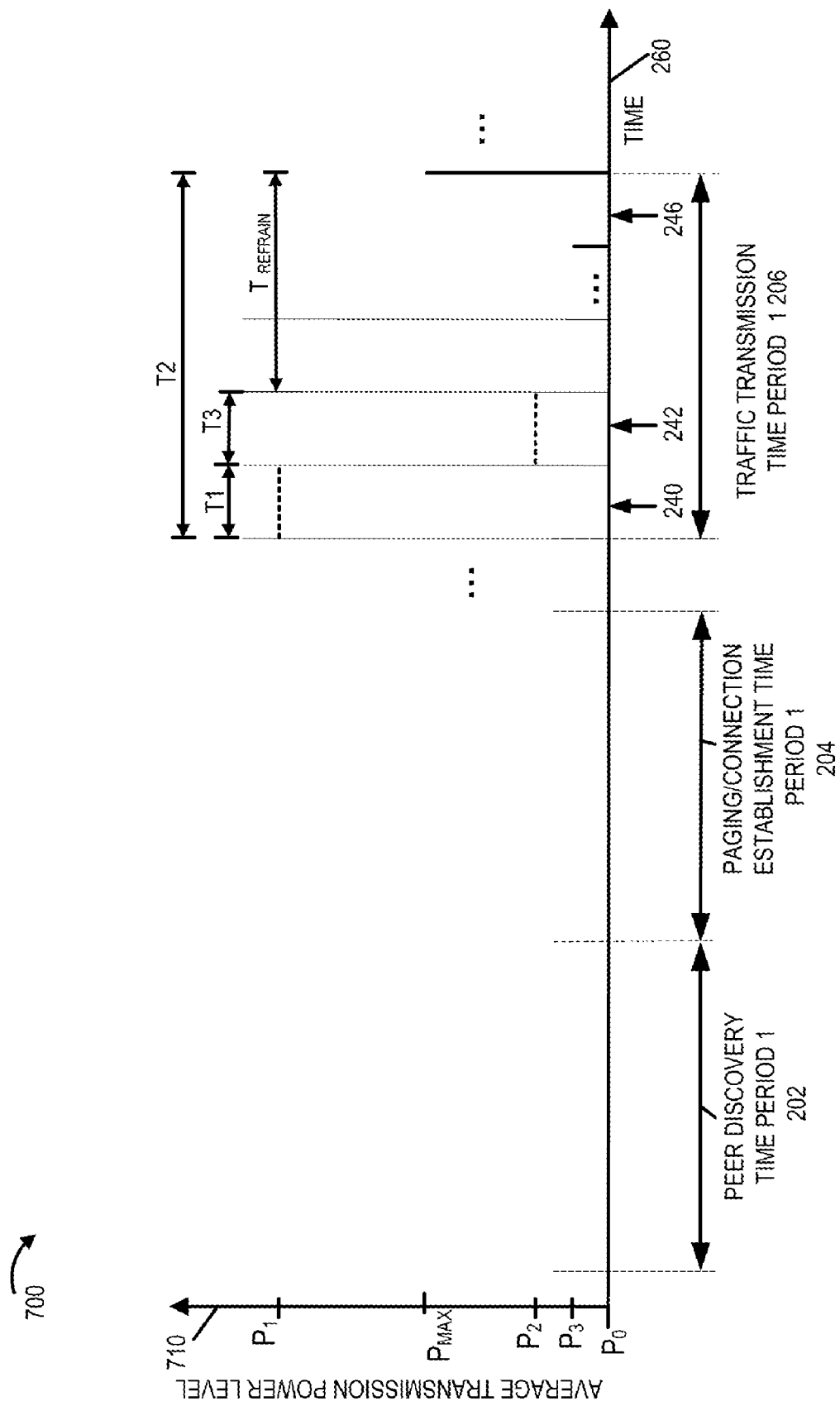
FIG. 7 is an exemplary diagram illustrating exemplary transmission power levels associated with various signals transmitted during different periods of time of a traffic transmission time period, in accordance with one exemplary embodiment.

FIG. 7 is an exemplary diagram 700 illustrating exemplary transmission power levels associated with various signals transmitted during different periods of time, in accordance with one exemplary embodiment. In FIG. 7 the vertical axis 710 represents average transmission power level and the horizontal axis 260 represents time. FIG. 7 illustrates exemplary transmission power levels $P_0$, $P_1$, $P_2$, $P_{MAX}$ etc., associated with various signals transmitted during different periods of time. In accordance with one aspect, when a communications device, e.g., device A 102, has established a connection with another peer device, it may, and sometimes does, transmit peer to peer traffic signals to the another peer device during the traffic transmission time period 1 206. FIG. 7 illustrates an example where a device, e.g., device A 102, transmits a first peer to peer traffic signal to a first peer with which it has an existing connection, e.g., device C 106, during a first predetermined period of time T1, which corresponds to time slot 240, using the first average transmission power level $P_1$ which exceeds the maximum average permitted power level $P_{MAX}$ that is permitted for a second predetermined period of time T2. The device, e.g., device A 102 transmits a second peer to peer traffic signal to a second peer device with which it has a connection, e.g., device B 104, during a third period of time T3, which corresponds to time slot 242, using the second average transmission power level $P_2$ which is lower than the first average power level $P_1$. As shown in the exemplary embodiment of FIG. 7, first and third transmission periods of time T1 and T3 are part of the traffic transmission time period 206.

In various embodiments, the communications device identifies devices with which it has an existing connection for which it has peer to peer traffic to be transmitted and matches an identified device with one of the high power traffic transmission predetermined time slot and the low power traffic transmission time slot. In some embodiments, the matching of a device associated with queued peer to peer traffic data to a transmission power level is performed as a function of one or more of: power measurements of received signals from the devices, estimated channel conditions, estimated ranges to the devices, the amount of data to be transmitted, latency requirements, loading requirements, and reliability requirements.

In this example, there is also a time period $T_{REFRAIN}$ during the traffic transmission time period 206 during which the device, e.g., device A 102, is controlled refrain from transmitting. In this example, $T_{REFRAIN}$ is longer than the first predetermined period of time $T_1$. It may also be observed that the second average transmission power level $P_2$ does not exceed the maximum average permitted power level $P_{MAX}$.

In some embodiments the first predetermined period of time T1 is a fixed period of time which recurs within a transmission time period schedule, e.g., schedule 200, according to a predetermined fixed pattern. In some embodiments, the maximum average permitted power level $P_{MAX}$, referred to in FIG. 7, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$ is a permitted power level permitted by government regulation or a communications protocol supported by the transmitter and being said fifth period of time when said maximum average permitted power level is a transmission power level which can be maintained without physical damage to said transmitter.

In the described example, it may be observed that during the first predetermined period of time T1, the transmitter of device A 102 transmitted traffic data to a first peer communications device, e.g., device C 106, and then refrained from transmitting to the first communications device for another period of time immediately following said first predetermined period of time T1, during which the transmission power is prevented from exceeding the first average transmission power level $P_1$. For example, during the time interval including T3 and $T_{REFRAIN}$, device A 102 does not transmit to device C 106, and the average transmission power level is below $P_1$. During third time period T3, which followed time period T1, device A 102 transmits traffic data to device B 104. The average transmission power for device A 102 used over the period of time T2, which includes time periods T1 and T3 is less than the maximum average permitted transmission power level.

Figure 8:
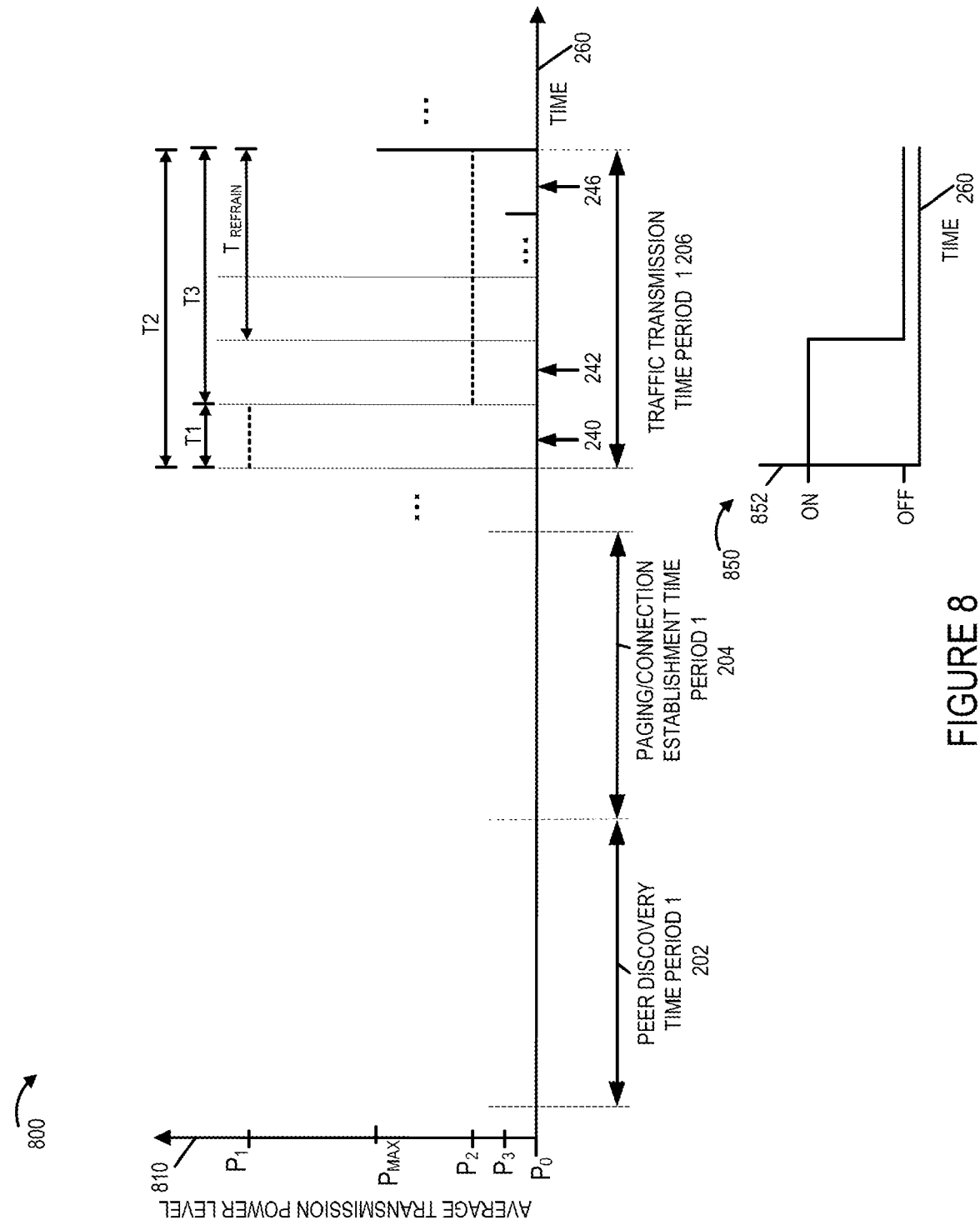
FIG. 8 includes an exemplary diagram illustrating exemplary transmission power levels associated with various signals transmitted during different periods of time and a corresponding transmitter status plot for a traffic transmission time period, in accordance with one exemplary embodiment.

FIG. 8 includes an exemplary diagram 800 illustrating exemplary transmission power levels associated with various signals transmitted during different periods of time and a corresponding transmitter status plot 850 for a traffic transmission time period, in accordance with one exemplary embodiment. In diagram 800 of FIG. 8 the vertical axis 810 represents average transmission power level and the horizontal axis 260 represents time. FIG. 8 shows various exemplary average transmission power levels such as a first average transmission power level $P_1$, a second average transmission power level $P_2$, a third average transmission power level $P_3$, and a zero or null average transmission power level $P_0$ that may be used by a communications device for transmitting signals during different time slots of the exemplary time periods 202, 204, 206, etc. It should be appreciated that when using an average power transmission power level the transmission power may temporarily exceed or drop below the average but will average to the indicated transmission power level for a particular time period, e.g., a given time slot or group of time slots.

In addition to $P_0, P_1, P_2, P_3$, a maximum permitted average transmission power level $P_{MAX}$ that is permitted for a predetermined period of time, is also shown on vertical axis 810. The exemplary time periods 202, 204, and 206 each of which includes one or more time slots discussed in FIG. 2, have been used for illustration purposes in the examples presented in FIG. 8 and have been identified using the same reference numbers. Each time slot or a group of time slots in the exemplary time periods 202, 204 and 206 may sometimes represent a different period of time.

In accordance with one aspect, a communications device, e.g., device A 102, transmits during a first predetermined period of time T1 using the first average transmission power level $P_1$ which exceeds the maximum average permitted power level $P_{MAX}$ that is permitted for a second predetermined period of time T2, and transmits during a third period of time T3 using a second average transmission power level $P_2$ which is lower than the first average power level. In the FIG. 8 example, use of the first average transmission power level $P_1$ is shown during the first predetermined period of time T1, e.g., slot 240. In the exemplary embodiment of FIG. 8, first and third periods of time T1 and T3 are part of the traffic transmission time period 1 206. It may be observed that the first predetermined period of time T1 is shorter than the second predetermined period of time T2. In this example, the third predetermined period of time T3 is longer than the first predetermined period of time T1. In the example of FIG. 8 the third predetermined period of time plus the first predetermined period of time equals the second predetermined period of time. In some other embodiments, the third period of time T3 equals or exceeds the second predetermined period of time.

A communications device such as device A 102 may transmit a peer to peer traffic signal to a peer device with which it has a connection, e.g., device C 106, during T1 using the first average transmission power level P1. As shown in FIG. 8, $P_1$ is much higher than the maximum permitted average transmission power level $P_{MAX}$. It should be appreciated that by using a much higher transmission power level $P_1$ during T1, device A 102 can transmit a traffic signal that can reach farther away devices which normally may not be reachable using lower transmission power levels. In some embodiments, the first average transmission power level $P_1$ is at least twice the maximum average permitted power level $P_{MAX}$. In some embodiments, in terms of dBs, $P_1/P_{MAX}$ is greater than or equal to 3 dBs. In some such embodiments, $P_1/P_{MAX}$ is greater than or equal to 10 dBs.

Device A 102 transmits a second traffic signal to a second peer device with which it has an existing connection, e.g., device B 104, during third period of time T3 at second average power level $P_2$, where the third period of time T3 corresponds to a time period including a plurality of peer to peer traffic transmission slots (traffic slot 240, traffic slot 242, . . . , traffic slot 246). In some embodiments, the third period of time T3 is at least ten times longer than the first predetermined period of time T1. During slot 242 of traffic transmission time period 1 206, device A 102 transmits a second traffic signal directed to a second peer device with which it has a connection, e.g., device B 104. Device A 102, in some embodiments, selects the second peer device, e.g., device B 104 from a plurality of peer communications device with which it has connections and has queued traffic waiting to be transmitted. In some embodiments, device A 102 performs selections for both the high power traffic slot and low power traffic slot, e.g., as a function of one or more of: power measurements of received signals from the devices, estimated channel conditions, estimated ranges to the devices, the amount of data to be transmitted, latency requirements, loading requirements, supported data rate, and reliability requirements.

Device A 102 refrains from transmitting signals following the first predetermined period of time T1 and the first slot of the third predetermined period of time T3, for a period of time $T_{REFRAIN}$. In this example $T_{REFRAIN}$ is longer than the difference between the second predetermined period of time T2 and the first predetermined period of time T1. In various embodiments, $P_1$ is selected such that an average transmit power over time T2 is below $P_{MAX}$.

Transmitter status plot 850 includes a vertical axis 852 identifying transmitter status and a horizontal axis 260 representing time. The transmitter status plot 850 indicates that the transmitter transmits at non-null power levels during traffic transmission slots 240 and 242, but does not transmit non-null signals during the subsequent slots of traffic transmission time period 206. These subsequent slots correspond to the time interval of $T_{REFRAIN}$. Third period of time T3 includes slot 242 and the time period of $T_{REFRAIN}$, and second average power level $P_2$ corresponds to time period T3; therefore, the average transmit power during time slot 242 is greater than $P_2$. A traffic signal is conveyed by the transmission that occurs during the slot 242 portion of third period of time T3. It may be observed that the second average transmission power level $P_2$ does not exceed the maximum average permitted power level.

In some embodiments the first predetermined period of time T1 is a fixed period of time which recurs within a transmission time period schedule, e.g., schedule 200, according to a predetermined fixed pattern. In some embodiments, the maximum average permitted power level $P_{MAX}$, referred to in FIG. 8, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$ is a permitted power level permitted by government regulation or a communications protocol supported by the transmitter and being said fifth period of time when said maximum average permitted power level is a transmission power level which can be maintained without physical damage to said transmitter.

It should be appreciated that by using a much higher transmission power level $P_1$ during T1, device A 102 is able to transmit traffic data to device C 106 which would otherwise not be reachable using lower transmission power levels. In accordance with one aspect and in order to abide by the government regulations on transmission power and/or to prevent any damage to the transmitting device, device A 102 transmits using the average transmission power level $P_1$ exceeding $P_{MAX}$ for a time T1; however, following the high power transmission during T1, device A 102 in some embodiments refrains from transmitting for another period of time $T_{REFRAIN}$ so that the average transmission power used over a time period that includes T1 and $T_{REFRAIN}$ does not exceed the maximum permitted average power level.

Figure 9:
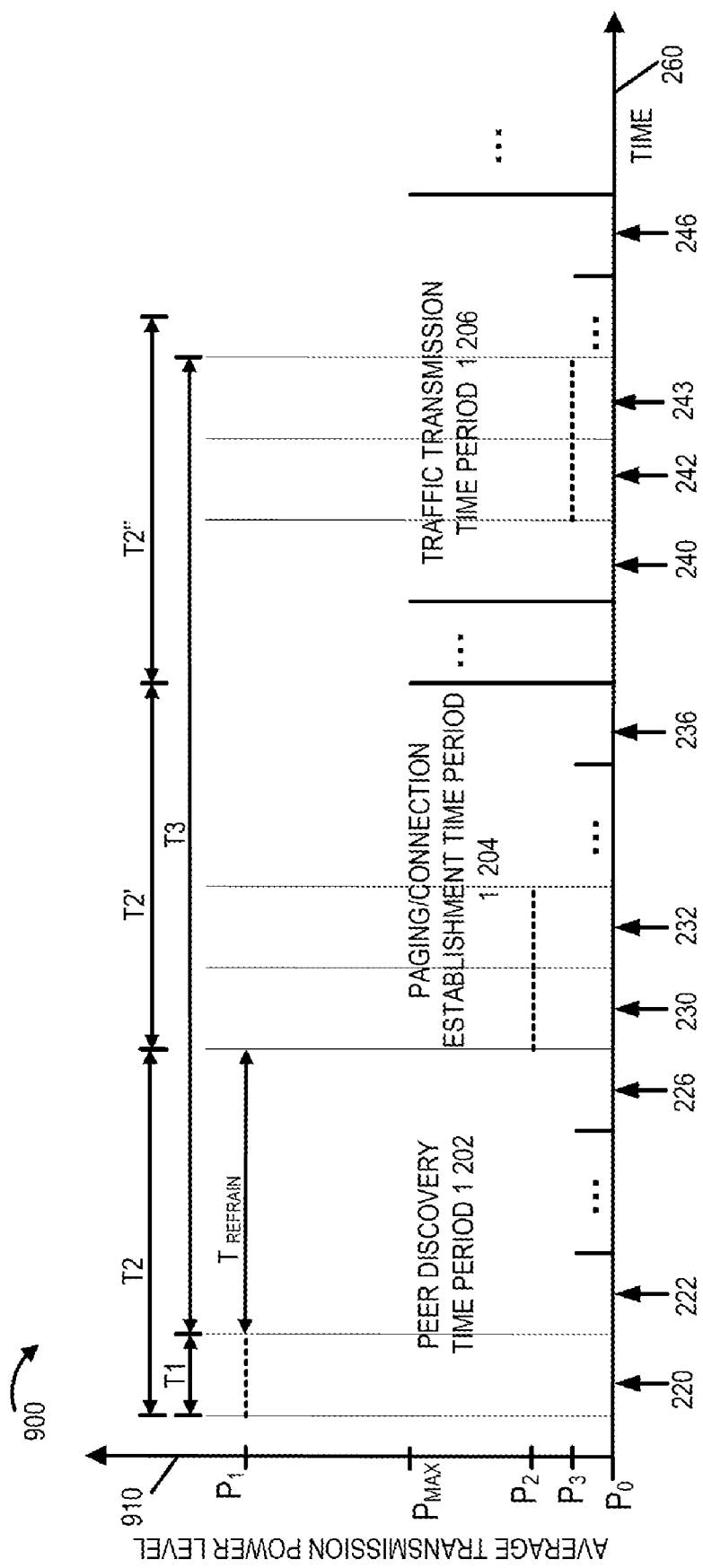
FIG. 9 is a drawing illustrating yet another example of exemplary transmission power levels associated with various signals transmitted during different periods of time in accordance with an exemplary embodiment.

FIG. 9 is a drawing 900 illustrating yet another example of exemplary transmission power levels $P_0$, $P_1$, $P_2$, $P_{MAX}$ etc., associated with various signals transmitted during different periods of time in accordance with an exemplary embodiment. In FIG. 9 the vertical axis 910 represents average transmission power level and the horizontal axis 260 represents time. In drawing 900 intervals T2, T2', T2", ..., each refer to a time interval associated with maximum average permitted power level $P_{MAX}$. FIG. 9 illustrates an example where a device, e.g., device A 102, transmits using first average transmission power level $P_1$ during the first predetermined period of time T1, which is part of the peer discovery time period 1 202. Following the high power transmission during T1, the device transmits using one or more lower power levels, e.g., using $P_2$, $P_3$, during the third period of time T3 which includes portions of the peer discovery time period 1 202, paging/connection establishment time period 1 204 and portions of the traffic transmission time period 1 206 as shown. In the illustrated example, a scenario is shown where device A 102 transmits a peer discovery signal at the high transmission power level $P_1$ during T1 (time slot 220) and transmits one or more signals using lower power levels during the third period of time T3, e.g., paging signals using average transmission power level $P_2$ (time slot 230 and 232), traffic data signals using average transmission power level $P_3$ (time slot 242 and 243). In the example of FIG. 9, the time period $T_{REFRAIN}$ during which device A 102 refrains from transmitting following the high power transmission during T1, is also a part of the third period of time T3.

In some embodiments, the maximum average permitted power level $P_{MAX}$, referred to in FIG. 9, is one of: i) a permitted power level permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time T1, said second predetermined period of time T2 being said fourth period of time when said maximum average permitted power level $P_{MAX}$ is a permitted power level permitted by government regulation or a communications protocol supported by the transmitter and being said fifth period of time when said maximum average permitted power level is a transmission power level which can be maintained without physical damage to said transmitter.

It should be appreciated that in various embodiments the intentional use of a higher average transmission power level during a short time period such as T1 is in one way beneficial in increasing the communication range so that distant devices can be reached and since the time period is short, any potential damage to the transmitting device that may be caused due to the use of higher transmission power level can also be avoided. Further, by interspacing the use of higher transmission power levels in some time periods with the use of lower transmission power levels, potential interference to nearby devices can also be mitigated. In some embodiments, T2 is a longer interval of time. For example, in some embodiments, T2 includes T1 and T3. In some embodiments, T2 includes at least one peer discovery time period, at least one paging/connection establishment time period and at least one traffic transmission time period.

Figure 10:
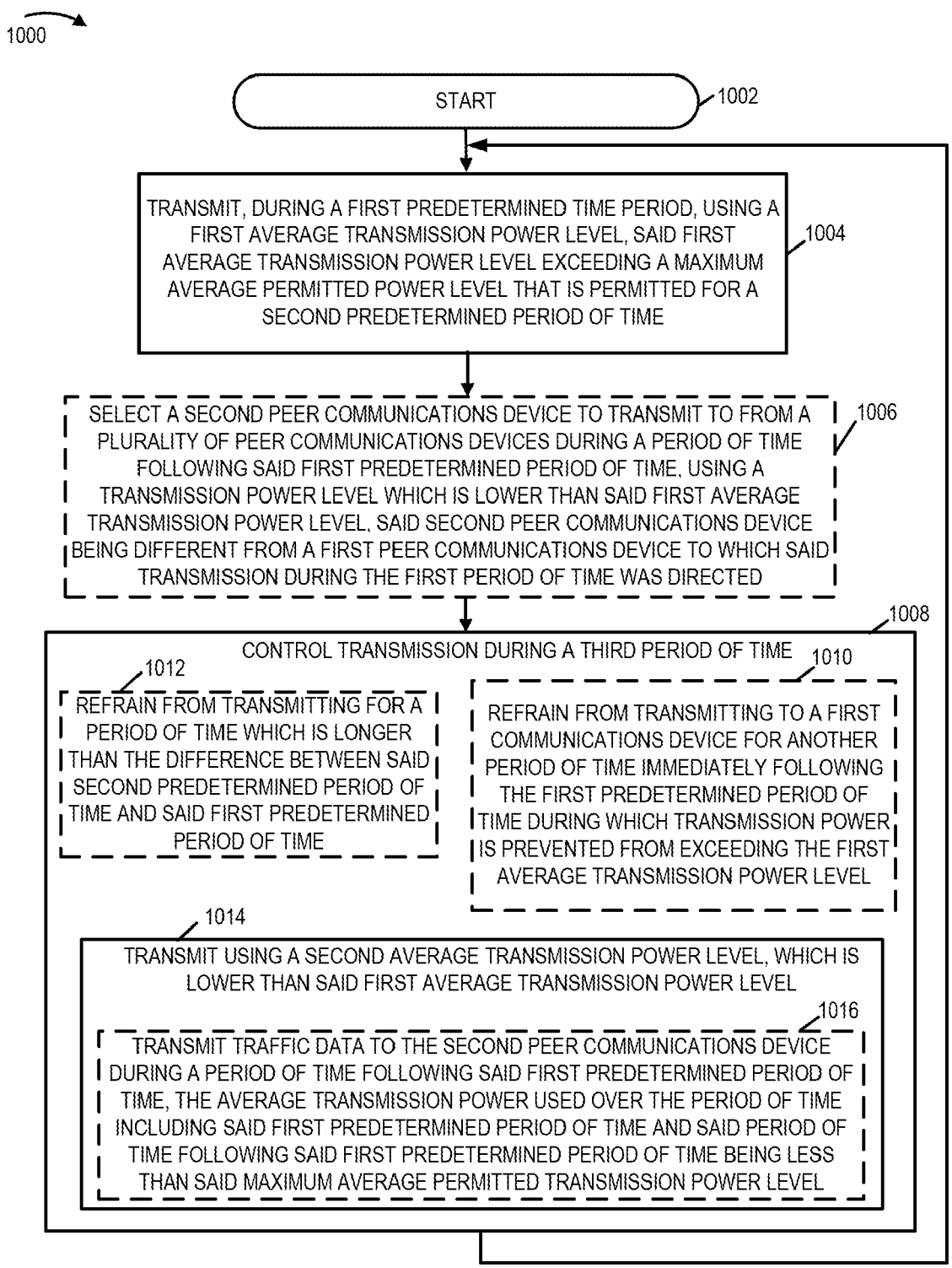
FIG. 10 is a flowchart of an exemplary communications method, in accordance with one exemplary embodiment.

FIG. 10 is a flowchart 1000 of an exemplary communications method, in accordance with one exemplary embodiment. The method can be implemented by one or more of the devices shown in the system 100 of FIG. 1. For the purpose of illustration, we will consider an example wherein the method is implemented by communications device A 102 which controls a transmitter to perform the steps of flowchart 1000. Various signals, e.g., 120, 122, 124, may be transmitted as part of the operation of device A 102, using various average transmission power levels during different time periods of a transmission time period schedule such as the schedule 200 of FIG. 2. Operation of the exemplary method starts in step 1002 where communications device A 102 is powered on and initialized. Operation proceeds from start step 1002 to step 1004.

In step 1004 communications device A 102 transmits during a first predetermined period of time T1, using first average transmission power level $P_1$, said first average transmission power level $P_1$ exceeding a maximum average permitted power level $P_{MAX}$ that is permitted for a second predetermined time, e.g., T2. For example, device A 102 may transmit, e.g., peer discovery signal, a paging signal or traffic data signal, during the first predetermined period of time T1 using power level $P_1$ to device C 106 which is far away from device A 102 in terms of physical distance. In some embodiments the first predetermined period of time T1 is a peer discovery time period, e.g., as discussed in the examples of FIG. 3, 4, and 9. In one such embodiment device A 102 transmits peer discovery signals using the first average transmission power level $P_1$ during T1 so that device A 102 discovery information can reach out to a greater number of devices in system 100 including far away devices, e.g., device C 106. In some embodiments the first predetermined period of time T1 is a fixed period of time which recurs within a transmission time period schedule, e.g., schedule 200 according to a predetermined fixed pattern. In some such embodiments the predetermined fixed pattern is a pattern of peer discovery time periods which reoccur according to the transmission time period schedule.

In some other embodiments, high power transmission using $P_1$ during T1 may be used for communicating traffic data during traffic transmission time period. In some such embodiments the first predetermined period of time is, e.g., a traffic transmission time period, as discussed in the examples of FIGS. 7 and 8. In one such embodiment device A 102 transmits traffic data to a first communications device, e.g., device C 106 which is far away, using the first average transmission power level $P_1$ during T1. In some embodiments the first predetermined period of time is shorter than the second predetermined period of time. In some embodiments the maximum permitted average power level $P_{MAX}$ is one of: i) a permitted power level, permitted by government regulation or a communications protocol supported by the transmitter of communications device A 102 implementing the method, to be maintained for a fourth period of time, and ii) a transmission power level which can be maintained for a fifth period of time without physical damage to the transmitter but if maintained for a longer period of time will cause physical damage to the transmitter of device A 102. In some such embodiments where the maximum average permitted power level $P_{MAX}$ is the permitted power level permitted by the government regulation, the fourth period of time is the second predetermined period of time T2. In some embodiments where the maximum average permitted power level $P_{MAX}$ is the transmission power level which can be maintained without physical damage to the transmitter, the fifth period of time is the second predetermined period of time T2. In at least one embodiment the first average transmission power level $P_1$ is at least twice the maximum average permitted power level $P_{MAX}$. In some embodiments $P_1$ is at least ten time $P_{MAX}$.

Operation proceeds from step 1004 to step 1006 which is an optional step and is performed in some embodiments. In step 1006 device A 102 selects a second peer communications device from the plurality of communications devices in system 100 to transmit to during a period of time following said first predetermined period of time T1, e.g., during time period T3, using a transmission power level which is lower than the first average transmission power level $P_1$, the second peer communications device being different from the first peer communications device to which the transmission during the first period of time was directed. For example, as discussed in step 1004 in one embodiment device A 102 transmits traffic data to the first peer device, e.g., device C 106 using the first average transmission power level $P_1$ during T1. Device A 102 may select the second peer device, e.g., device B 104, which is closer to device A 102, to transmit to during the third period of time T3 using transmission power level $P_2$ which is lower than $P_1$, wherein the third period of time T3 is after the high power transmission time period T1. It should be appreciated that sometimes device A 102 may make such a selection from, e.g., a list of a plurality of devices with which device A 102 wishes to communicate, based on, e.g., the physical distance of device A 102 from the other devices in the list or the average transmission power levels needed for communicating the signal/traffic data to the devices in the list. Other criteria for selection, used in some embodiments, include one or more of: amount of data to be waiting to be transmitted, channel quality, latency considerations, and reliability criteria, e.g., acceptable bit error rate. In some embodiments, selection is performed prior to the first predetermined time period, e.g., with a first target device being selected to receive the high power signal transmitted during the first time period and a second target device being selected to receive the lower power signal transmitted during the third time period. Operation proceeds from step 1006 to step 1008. In the embodiments where optional step 1006 is skipped, the operation proceeds from step 1004 to step 1008.

In step 1008 device A 102 controls transmission during a third period of time. Step 1008 includes sub-step 1014 in which device A 102 transmits using a second average transmission power level $P_2$, which is lower than said first average transmission power level $P_1$. In some embodiments, step 1008 includes one or more of sub-steps 1012 and 1010, which may be performed during the third period of time depending on the embodiment. Some of the sub-steps, e.g., 1010 and 1012, which are shown in the flowchart 400 using dashed line boxes are optional and thus may be performed in some embodiments while not in others. Step 1010 is optionally performed, e.g., in some embodiments where the first period of time T1 is the time during which the transmitter of device A 102 transmits traffic data to a first communications device, e.g., device C 106. In step 1010 device A 102 refrains from transmitting to the first communications device, e.g., device C 106, for another period of time, immediately following the first period of time T1, e.g., $T_{REFRAIN}$, during which the transmission power is prevented from exceeding the first average transmission power level $P_1$. It should be appreciated that in at least some embodiments this is done in order to avoid the usage of high transmission power in the time period immediately following the first period of time T1, so that any damage to device A 102, e.g., due to over heating due to continuous usage of high transmission power level $P_1$, can be prevented and/or to avoid any non-compliance to a regulation and/or communications standard. It should be further appreciated that although transmission to the first device C 106 is refrained, device A 102 however may, in some embodiments, still decides to transmit to some other nearby devices at much lower transmission power levels, e.g., $P_2$, $P_3$ etc.

In sub-step 1012 which is optionally performed in some embodiments, device A 102 refrains from transmitting for a period of time which is longer than the difference between the second predetermined period of time T2 and the first predetermined period of time T1. Thus in some such embodiments device A 102 may stay quiet and not transmit at all for a certain refrain time period, e.g., a predetermined refrain time period. For example, following higher power transmission during T1 in a peer discovery time period 202, device A 102 may refrain from transmitting for time period $T_{REFRAIN}$, as shown in FIG. 3 and FIG. 4. In one such embodiment peer device A 102 transmits a peer discovery signal during T1 using transmission power level $P_1$ and then refrains from transmitting signal and/or traffic data for time period $T_{REFRAIN}$ such that $T_{REFRAIN} > T2 - T1$.

In sub-step 1014, device A 102 transmits using a second average transmission power level $P_2$, which is lower than said first average transmission power level $P_1$. For example, in one embodiment following high power transmission during T1 of a peer discovery signal, device A 102 transmits more peer discovery signals using average transmission power level $P_2$ during the third period of time T3, e.g., as shown in the FIG. 4 example as a low power transmission in time slot 226 which is a part of the third period of time T3. In some such embodiments the second average power level $P_2$ does not exceed the maximum average permitted power level $P_{MAX}$. In some embodiments the third period of time T3 is longer than the first predetermined period of time T1. In some such embodiments the third period of time T3 is at least 10 times longer than the first predetermined period of time T1. In some embodiments the third period of time T3 equals or exceeds the second predetermined period of time T2. As part of the transmission operation, in some embodiments, device A 102 transmits traffic data to the second peer communications device, e.g., device B 104 selected in step 1006, during a period of time following the first predetermined period of time T1, e.g., during T3, as indicated by reference number 1016. The average transmission power used over the period of time including the first period of time T1 and the period of time following the first period of time T1, e.g., time period T3, is, in some embodiments, less than the maximum average permitted transmission power level $P_{MAX}$. In some embodiments the traffic data to the second peer device is transmitted using an average transmission power level which is lower than $P_1$, e.g., $P_2$, $P_3$ etc. Thus it should be appreciated that the average power used over the time period, e.g., T1+T3, remains less than the maximum permitted power and thus avoids any non compliance with the regulation and/or prevents any potential physical damage to the transmitter of device A 102 due to the reasons discussed earlier. It should be further appreciated that in some embodiments, e.g., where device A 102 uses high transmission power level $P_1$ to transmit traffic data to a distant device C 106, device A 102 intentionally selects one or more devices, e.g., device B 104 and/or Kth device 110, with which it is possible to communicate using low power levels, to transmit traffic data to during the third period of time T3.

In some embodiments, there are more time periods, e.g., time slots, during which the lower transmission power levels, e.g., $P_2$, $P_3$ are used in the recurring transmission time schedule than there are time periods during which the first average transmission power level $P_1$ is used. Operation proceeds from step 1008 back to step 1004.

In some embodiments, the exemplary method includes a step of determining device location, e.g., based on received GPS signals and/or received reference signals such as received base station beacon signals. In various embodiments the exemplary method further includes one or more or a step of selecting a set of power levels to use from a plurality of sets of power levels to use as a function of device location and a step of selecting a timing structure including predetermined timing periods associated with different power levels as a function of device location. In some embodiments, the exemplary method further includes a step of determining a peer device's range as function of received signals. In some such embodiments, the method further includes a sub-step of determining a transmit power level corresponding to detected received signal as a function of position in the timing structure being implemented.

The exemplary method, in some embodiments includes one or more of: a step of selecting peer discovery information to be transmitted in a high power slot at a high transmit power level, a step of selecting peer discovery information to be transmitted in a low power slot at a low transmission power level, a step of selecting a device to be paged for a high power slot, a step of selecting a device to be paged for a low power slot, a step of selecting a target device for high power traffic signals to be transmitted in a high power traffic slot, a step of selecting a target device for low power traffic signals to be transmitted to in a low power traffic slot.

Figure 11:
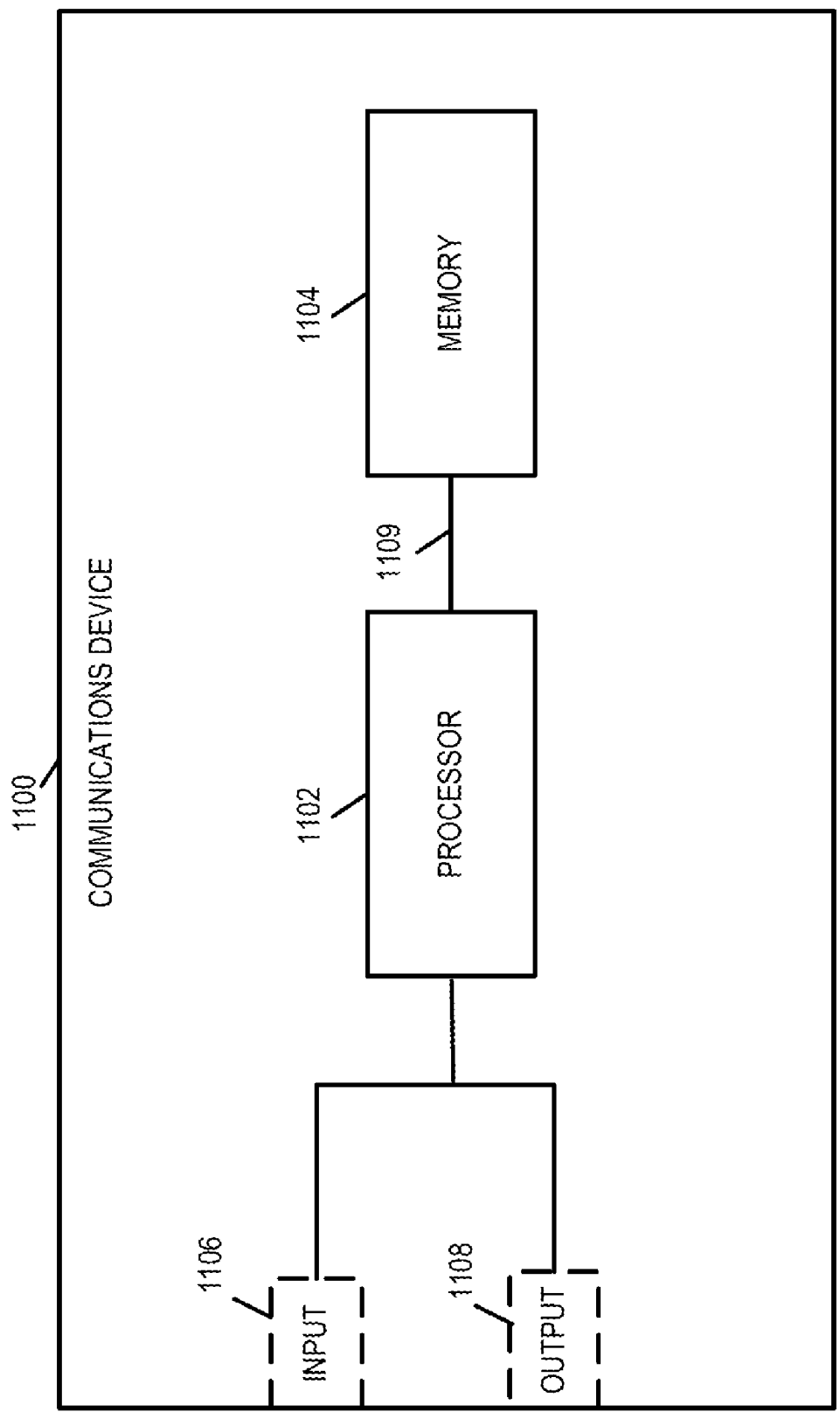
FIG. 11 illustrates an exemplary peer to peer communications device which can be used in the exemplary system shown in FIG. 1.

FIG. 11 is a drawing of an exemplary communications device 1100 in accordance with one exemplary embodiment. Communications device 1100 may be, and in at least one embodiment is, a mobile wireless terminal supporting peer to peer communications and implementing a method in accordance with flowchart 1000 of FIG. 10. The communications device 1100 may be used, e.g., as the communication device A 102 of FIG. 1. Communications device 1100 includes a processor 1102 and memory 1104 coupled together via a bus 1109 over which the various elements (1102, 1104) may interchange data and information. Communications device 1100 further includes an input module 1106 and an output module 1108 which may be coupled to the processor 1102 as shown. However, in some embodiments the input module and output module 1106, 1108 are located internal to the processor 1102. Input module 1106 can receive input signals. Input module 1106 can, and in some embodiments does, include a wireless receiver and/or a wired or optical input interface for receiving input. Output module 1108 may include, and in some embodiments does include, a wireless transmitter and/ or a wired or optical output interface for transmitting output.

Processor 1102, in some embodiments, is configured to transmit during a first predetermined period of time T1 using a first average transmission power level $P_1$, said first average transmission power level exceeding a maximum average permitted power level that is permitted for a second predetermined period of time T2, and transmit during a third period of time T3 using a second average transmission power level $P_2$ which is lower than said first average transmission power level $P_1$. The first predetermined period of time T1 in some embodiments is shorter than the second predetermined period of time. In some embodiments the first average transmission power level $P_1$ is at least twice the maximum average permitted power level $P_{MAX}$. In some embodiments the third period of time T3 is longer than said first predetermined period of time T1. The third period of time T3, in some embodiments, equals or exceeds the second predetermined period of time T2. In some embodiments the first predetermined period of time is a peer discovery time period. In some embodiments the third period of time T3 is at least 10 times longer than the first predetermined period of time T1.

Processor 1102, in some embodiments, is configured to control the device 1100 to refrain from transmitting following the transmission during said first predetermined period of time T1, for a period of time which is longer than the difference between said second predetermined period of time T2 and the first predetermined period of time T1. In some embodiments the first period of time T1 is a fixed period of time which recurs within a transmission time period schedule according to a predetermined fixed pattern. In some such embodiments the predetermined fixed pattern is a pattern of peer discovery time periods which reoccur according to said transmission time period schedule.

In some embodiments the first predetermined period of time T1 is a time period during which the processor 1102 is configured to transmit traffic data to a first peer communications device, e.g., device C 106. In some such embodiments the processor 1102 is further configured to control the device 1100 to refrain from transmitting to the first peer communications device for another period of time, immediately following said first predetermined period of time, during which transmission power is prevented from exceeding the first average transmission power level. In some such embodiments the processor 1102 is further configured to select a second peer communications device e.g., Kth device 110, to transmit to, from a plurality of peer communications devices, during a period of time following said first predetermined period of time using a transmission power level which is lower than said first average transmission power level, the second peer communication device being different from said first peer communications device. In some such embodiments the processor 1102 is further configured to transmit traffic data to the second peer communication device, during a period of time following said first predetermined period of time, e.g., during T3, the average transmission power used over the period of time including said first predetermined period of time T1 and said period of time following said first predetermined period of time being less than said maximum average permitted transmission power level.

Figure 12:
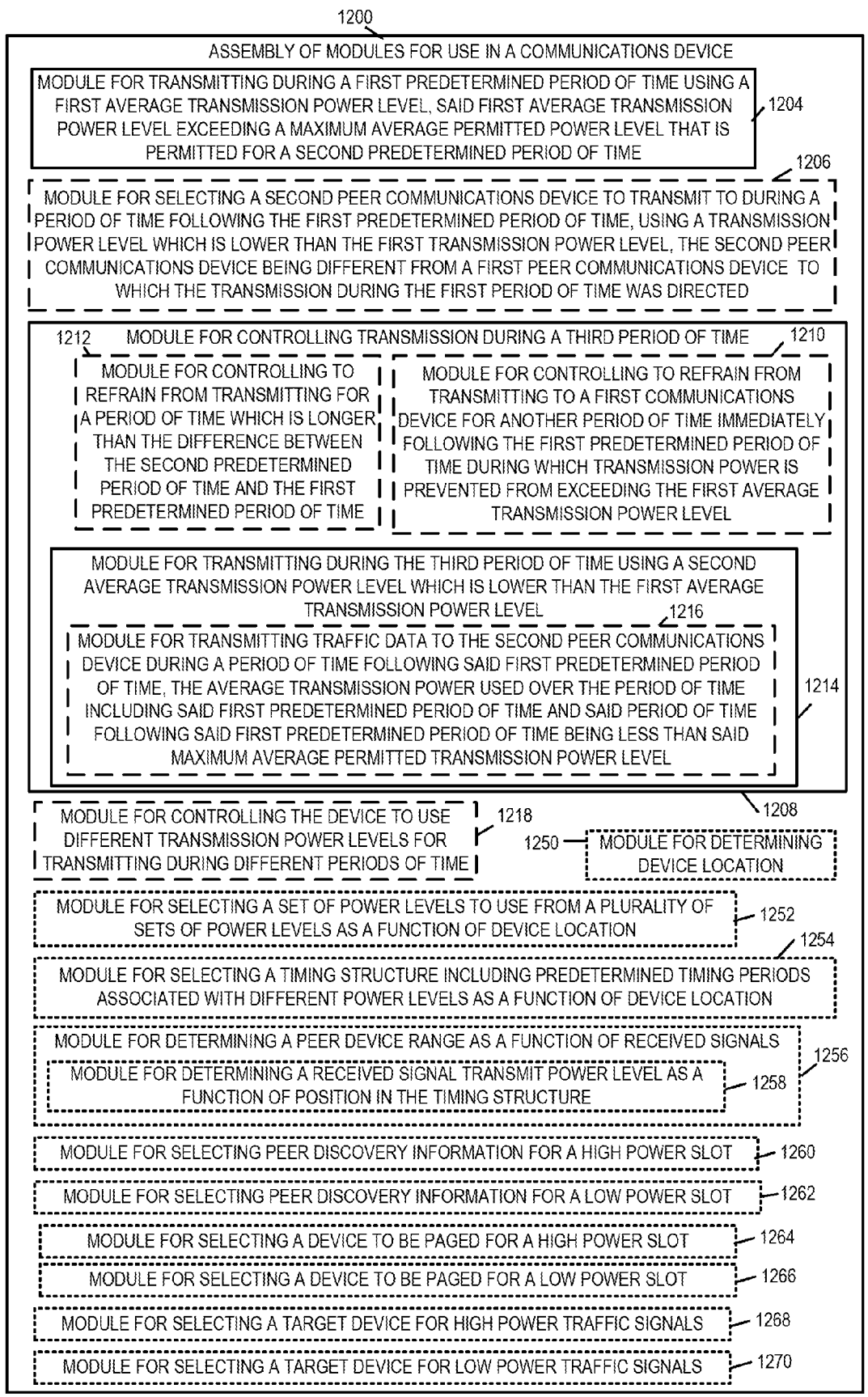
FIG. 12 illustrates an assembly of modules which can be used in the exemplary communications device of FIG. 11.

FIG. 12 is an assembly of modules 1200 which can, and in some embodiments are, used in the communications device 1100 illustrated in FIG. 11. The modules in the assembly 1200 can be implemented in hardware within the processor 1102 of FIG. 11, e.g., as individual circuits. Alternatively, the modules may be implemented in software and stored in the memory 1104 of the communications device 1100 shown in FIG. 11. While shown in the FIG. 11 embodiment as a single processor, e.g., computer, it should be appreciated that the processor 1102 may be implemented as one or more processors, e.g., computers.

When implemented in software the modules include code, which when executed by the processor 1102, configure the processor to implement the function corresponding to the module. In embodiments where the assembly of modules 1200 is stored in the memory 1104, the memory 1104 is a computer program product comprising a computer readable medium comprising code, e.g., individual code for each module, for causing at least one computer, e.g., processor 1102, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the communications device 1100 or elements therein such as the processor 1102, to perform the functions of the corresponding steps illustrated in the method flowchart 1000 of FIG. 10.

The assembly of modules 1200 includes a module corresponding to each step of the method shown in FIG. 10. A module in FIG. 12 performs or controls the processor 1102 to perform a corresponding step, e.g., a step shown and/or described with respect to FIG. 10. For example module 1204 corresponds to step 1004 and is responsible for performing the operation described with regard to step 1004.

As illustrated in FIG. 12, the assembly of modules 1200 includes a module 1204 for transmitting during a first predetermined period of time using a first average transmission power level, the first average transmission power level exceeding a maximum average permitted power level that is permitted for a second predetermined period of time, a module 1206 for selecting a second peer communications device to transmit to during a period of time following the first predetermined period of time using a transmission power level which is lower than the first average transmission power level, the second peer communications device being different from a first peer communications device to which the transmission during the first period of time was directed, and a module 1208 for controlling transmission during a third period of time. Module 1208 includes a module 1214 for transmitting during the third period of time using a second average transmission power level which is lower than the first average transmission power level. Module 1208 also includes a module 1210 for controlling the device 1100 to refrain from transmitting to the first peer communications device for another period of time, immediately following the first predetermined period of time during which transmission power is prevented from exceeding the first average transmission power level, and a module 1212 for controlling the device 1100 to refrain from transmitting following the transmission during the first predetermined period of time, for a period of time which is longer than the difference between the second predetermined period of time and the first predetermined period of time. The modules 1210 and 1212 are optional, and thus one or both of the modules 1210, 1212 may be present in some embodiments while not in others.

In some embodiments module 1214 includes a module 1216 for transmitting traffic data to the second peer communications device during a period of time following the first predetermined period of time, the average transmission power used over the period of time including the first predetermined period of time and said period of time following the first predetermined period of time being less than the maximum average permitted power level. The modules that are shown using dashed boxes indicate that although these modules are included in the assembly of modules 1200, the processor 1102 may execute such a module in embodiments where the step to which these modules correspond, is performed. The assembly of modules 1200, in some embodiments, further includes a control module 1218 for controlling the device 1100 to use different transmission power levels for transmitting during different periods of time, e.g., different predetermined periods of time.

In some embodiments, the assembly of modules 1200 includes one or more of: a module 1250 for determining device 1100 location, a module 1252 for selecting a set of power levels to use from a plurality of sets of power levels as a function of device location, a module 1254 for selecting a timing structure including predetermined timing periods associated with different power levels as a function of device location, a module 1256 for determining an estimated peer device range from device 1100 as a function of device location. In some embodiments, module 1256 includes a module 1258 for determining a received signal transmit power level as a function of position in the timing structure.

Module 1250 determines device location, e.g., based on received GPS signals and/or received fixed location reference signals such as received base station beacon signals. Module 1254, in some embodiments, uses the location determination of module 1250 and stored information, associating different locations with different set of power levels, to select a set of power levels to use for transmission at its current location. For example at different locations, different regulations and/or standards may apply, and the different regulations or standards may have different maximum power levels to be enforced, e.g., different $P_{MAX}$–T2 time specs. A particular set of power levels to be used for transmission, e.g., $P_1$, $P_2$, $P_3$ may be tailored to allow compliance to the $P_{MAX}$–time T2 regulation or standard to be enforced, yet provide for a wide range of communication coverage.

Module 1254, in some embodiments, selects from a plurality of recurring timing structures as a function of the location determination of module 1250. For example, different peer to peer timing structures may be implemented in different geographic locations.

Module 1256 determines a peer device range, e.g., based on a received signal strength measurement. In some embodiments, the same general type of signal may be transmitted at different transmit power levels as a function of position in the timing structure. For example, in some embodiments peer discovery signals transmitted during a T1 time period are transmitted at a high power level, while peer discovery signals transmitted during a T3 time period are transmitted at a low transmit power level. Module 1258 uses stored information about the timing structure and power level relationships to determine a transmit power level corresponding to a received signal. The transmit power level along with received signal power level is used in determining estimated range.

In various embodiments, assembly of modules 1200 includes one or more of: a module 1260 for selecting peer discovery information to be transmitted in a high transmission power slot, a module 1262 for selecting peer discovery information to be transmitted in a low transmission power slot, a module 1264 for selecting a device to be paged for a high transmission power slot, a module 1266 for selecting a device to be paged for a low transmission power slot, a module 1268 for selecting a target device for high power traffic signals, and a module 1270 for selecting a target device for low power traffic signals.

In some embodiments, one or more modules shown in FIG. 12 as included within another module may be implemented as an independent module or modules. For example, module 1212, in some embodiments, may be implemented as a standalone module with regard to module 1208.

Various features and aspects related to apparatus and methods of controlling maximum transmission power for increasing communication range, used in some embodiments, will be described. Consider a wireless communications system, e.g., a peer to peer wireless communications system including a plurality of wireless communications devices including device A and device B supporting a peer to peer communications protocol. In order for device A to successfully send a signal to device B through a wireless channel, device B needs to be in the communication range of device A. The communication range can be characterized by the link budget and depends on many factors such as the antenna employed at device A or B, the propagation environment of the wireless channel, the data rate of the signal, and the transmission power used by device A. The communication range increases with the transmission power.

However, device A cannot arbitrarily increase the transmission power for the following reasons. First, the transmission power has to satisfy the regulatory requirements and/or communications protocols standard requirements. Second, the power amplifier has certain heat dissipation capability. During the transmission, if heat is generated at a rate exceeding the heat dissipation capability for an extended period of time, then the accumulated heat may damage the circuitry. As a result, usually there is a notion of maximum transmission power and device A never exceeds the maximum transmission power. There may be other reasons which are taken into consideration. For example, the increase in the transmission power increases interference to other communications, which may not be desired from the perspective of overall system capacity. However, in a less congested scenario, the communication range is generally more important than the interference reduction, in which case increasing transmission power is sometimes preferred if possible.

Various exemplary embodiments describe methods of increasing the transmission power budget so as to increase the communication range for a short period of time. For example, the time period can be as short as a few milliseconds or less. After the actual transmission power is increased to take advantage of the increased budget for a short period of time, the budget is reduced, e.g., back to the normal level, for a relatively long period of time, e.g., at least tens of milliseconds. A key difference from other approaches is that the transmission power budget and therefore the communication range vary with time.

The reasons that the transmission power budget can be increased temporarily are as follows. First, the regulatory requirements typically measure average transmission power over a relatively long time period, e.g., a few seconds. Therefore, even though the transmission power budget is increased for a short period, the overall average power can still be managed to stay within the regulatory requirements. Second, even if heat is accumulated when the transmission power budget is increased, as long as the time period is controlled to be short, the heat accumulation would not be great enough to damage the circuitry.

In some embodiments, a device maintains at least two levels of maximum transmission power, P1 and P2, where P1>P2. For example, P1 is at least 10 dBs higher than P2. In one embodiment, the device employs a fixed and predetermined time schedule of regulating its maximum transmission power. For example, in every 100 ms, the maximum transmission power is set to be P1 in the first 10 ms, and then to be P2 in the remaining 90 ms, and the pattern repeats. In another embodiment, the device monitors whether the current transmission power reaches P1. If so, then the device makes sure that, after a fixed short period of time, the transmission power is set to be no more than P2. Then the device sets a timer to be a fixed relatively long time interval, and makes sure that the transmission power does not exceed P2 until the timer expires. The device may then be allowed to set transmission power to P1. In yet another embodiment, the device keeps record of its transmission power over a time interval, calculates the average transmission power and compares it with a limit set by corresponding regulatory requirements. The device decides to reduce the transmission power if the calculated value gets close to or even exceed the limit. In another embodiment, the device is equipped with a sensor that measures the amount of overheat. The device may set the maximum transmission power to be P1 until the sensor reports overheat condition, and then reduce the maximum transmission power to be P2. An exemplary operation protocol in an exemplary peer-to-peer communication system is explained in the following.

Peer discovery. First, each of devices A and B broadcasts a peer discovery signal, which indicates the presence of the device.

Paging. After receiving the peer discovery signal from device B, device A is now aware of the presence of device B. Suppose that device A intends to communicate with device B. Then device A pages device B to establish a connection.

Traffic. Once the connection is available, the traffic between A and B can be transported in the connection. When device A intends to send the traffic to device B, device A first sends a request signal based on the CID (connection ID). After device B receives a response signal from device B, device A proceeds to send a pilot, which is wideband multi-tone signal, for device B to measure the SINR, which is fed back to device A to determine a data rate. Device A then transmits the traffic to device B using the determined data rate. Finally device B sends an acknowledgment to device B.

In accordance with a feature of some embodiments, the peer discovery and/or paging signal is sent with constant maximum transmission power, e.g., P1. However, the maximum transmission power used by the traffic signal varies with time. For example, the device may use the maximum transmission power P1 at most in K1 traffic slots and then have to reduce the maximum transmission power to P2 for another K2 traffic slots before the maximum transmission power back to P1. In one embodiment, the maximum transmission power used the request and the traffic signals in a given traffic slot is the same. In another embodiment, in a given traffic slot, the request signal uses maximum transmission power P1 but the traffic signal uses maximum transmission power P2. The reason is that the traffic signal may be more flexible to take advantage of coding gain to compensate for reduced maximum transmission power.

For the above discussion it should be appreciated that numerous variations and embodiments are possible. The duration of the first, second and/or third symbol time periods may be an positive non-zero multiple of the duration of a symbol transmission time period, e.g., an OFDM symbol transmission time period in some embodiments. For example, in some but not necessarily all embodiments each of the first, second and third transmission time periods include multiple symbol transmission time periods, e.g., in some embodiments two or more symbol transmission time periods are included in each of the first, second and third time periods. In other embodiments, three or more symbol transmission time periods are included in each of the first, second and third time periods. In some embodiments, at least one of the first, second and third time periods include different numbers of symbol transmission time periods then is included in another one of the first, second and third time periods.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A communications method, the method comprising operating a transmitter to perform the steps of:

transmitting during a first predetermined period of time using a first average transmission power level, said first average transmission power level exceeding a maximum average permitted power level that is permitted for a second predetermined period of time, wherein said first predetermined period of time is a fixed period of time which recurs within a transmission time period schedule according to a predetermined fixed pattern; and transmitting during a third period of time using a second average transmission power level which is lower than said first average transmission power level.

2. The method of claim 1, further comprising:
following transmitting during said first predetermined period of time:
refraining from transmitting for a period of time which is longer than the difference between said second predetermined period of time and said first predetermined period of time.

3. The method of claim 1, wherein said maximum average permitted power level is one of: i) a permitted power level, permitted by government regulation or a communications protocol supported by the transmitter, to be maintained for a fourth period of time, and ii) a transmission power level which can be maintained for a fifth period of time without physical damage to said transmitter but if maintained for a longer period of time will cause physical damage to said transmitter, said fourth and fifth periods of time being longer than said first predetermined period of time, said second predetermined period of time being said fourth period of time when said maximum average permitted power level is a permitted power level permitted by government regulation and being said fifth period of time when said maximum average permitted power level is a transmission power level which can be maintained without physical damage to said transmitter.

4. The method of claim 3, wherein said first predetermined period of time is a peer discovery time period.

5. The method of claim 3, wherein said first average transmission power level is at least twice the maximum average permitted power level.

6. The method of claim 3, wherein said first predetermined period of time is a time period during which said transmitter transmits traffic data to a first peer communications device, the method further comprising:
refraining from transmitting to said first peer communications device for another period of time, immediately following said first predetermined period of time, during which transmission power is prevented from exceeding the first average transmission power level.

7. The method of claim 3, wherein said first predetermined period of time is a time period during which said transmitter transmits traffic data to a first peer communications device, the method further comprising:
transmitting traffic data to a second peer communication device during a period of time following said first predetermined period of time, the average transmission power used over the period of time including said first predetermined period of time and said period of time following said first predetermined period of time being less than said maximum average permitted transmission power level.

8. The method of claim 7, further comprising:
selecting said second peer communications device to transmit to from a plurality of peer communications devices during a period of time following said first predetermined period of time using a transmission power level which is lower than said first average transmission power level, said second peer communication device being different from said first peer communications device.

9. A communications device comprising:
means for transmitting during a first predetermined period of time using a first average transmission power level, said first average transmission power level exceeding a maximum average permitted power level that is permitted for a second predetermined period of time, wherein said first predetermined period of time is a fixed period of time which recurs within a transmission time period schedule according to a predetermined fixed pattern; and
means for transmitting during a third period of time using a second average transmission power level which is lower than said first average transmission power level.

10. The device of claim 9, further comprising:
means for controlling to refrain from transmitting following the transmission during said first predetermined period of time, for a period of time which is longer than the difference between said second predetermined period of time and said first predetermined period of time.

11. The device of claim 9, wherein said maximum average permitted power level is one of: i) a permitted power level, permitted by government regulation or a communications protocol supported by the communications device, to be maintained for a fourth period of time, and ii) a transmission power level which can be maintained for a fifth period of time without physical damage to said communications device but if maintained for a longer period of time will cause physical damage to said communications device, said fourth and fifth periods of time being longer than said first predetermined period of time, said second predetermined period of time being said fourth period of time when said maximum average permitted power level is a permitted power level permitted by government regulation and being said fifth period of time when said maximum average permitted power level is a transmission power level which can be maintained without physical damage to said communications device.

12. The device of claim 11, wherein said first predetermined period of time is a time period during which said communications device transmits traffic data to a first peer communications device, the device further comprising:
means for controlling to refrain from transmitting to said first peer communications device for another period of time, immediately following said first predetermined period of time, during which transmission power is prevented from exceeding the first average transmission power level.

13. The device of claim 11, wherein said first predetermined period of time is a time period during which said communications device transmits traffic data to a first peer communications device, the device further comprising:
means for transmitting traffic data to a second peer communication device during a period of time following said first predetermined period of time, the average transmission power used over the period of time including said first predetermined period of time and said period of time following said first predetermined period of time being less than said maximum average permitted transmission power level.

14. A computer program product for use in a communications device, the computer program product comprising:
a non-transitory computer readable medium comprising code executable by at least one computer to:
transmit during a first predetermined period of time using a first average transmission power level, said first average transmission power level exceeding a maximum average permitted power level that is permitted for a second predetermined period of time, wherein said first predetermined period of time is a fixed period of time which recurs within a transmission time period schedule according to a predetermined fixed pattern; and transmit during a third period of time using a second average transmission power level which is lower than said first average transmission power level.

15. A communications device comprising:
at least one processor configured to:
  transmit during a first predetermined period of time using a first average transmission power level, said first average transmission power level exceeding a maximum average permitted power level that is permitted for a second predetermined period of time, wherein said first predetermined period of time is a fixed period of time which recurs within a transmission time period schedule according to a predetermined fixed pattern; and
  transmit during a third period of time using a second average transmission power level which is lower than said first average transmission power level; and
a memory coupled to said at least one processor.

16. The device of claim 15, wherein said at least one processor is further configured to:
  control the device to refrain from transmitting following the transmission during said first predetermined period of time, for a period of time which is longer than the difference between said second predetermined period of time and said first predetermined period of time.

17. The device of claim 15, wherein said first predetermined period of time is a time period during which said at least one processor is configured to transmit traffic data to a first peer communications device, said at least one processor being further configured to:
  control the device to refrain from transmitting to said first peer communications device for another period of time, immediately following said first predetermined period of time, during which transmission power is prevented from exceeding the first average transmission power level.

18. The device of claim 15, wherein said first predetermined period of time is a time period during which said at least one processor is configured to transmit traffic data to a first peer communications device, said at least one processor being further configured to:
  transmit traffic data to a second peer communication device during a period of time following said first predetermined period of time, the average transmission power used over the period of time including said first predetermined period of time and said period of time following said first predetermined period of time being less than said maximum average permitted transmission power level.

19. The device of claim 18, wherein said at least one processor is further configured to:
  select said second peer communications device to transmit to from a plurality of peer communications devices during a period of time following said first predetermined period of time using a transmission power level which is lower than said first average transmission power level, said second peer communication device being different from said first peer communications device.

* * * * *